United States Patent [19]
Sugahara et al.

[11] Patent Number: 5,777,294
[45] Date of Patent: Jul. 7, 1998

[54] LASER BEAM MACHINING SYSTEM AND METHOD USING PRELIMINARY WORK COMMANDS

[75] Inventors: Masayuki Sugahara; Toshihiro Mori, both of Aichi, Japan

[73] Assignee: Mitsubishi Denki Kabushiki Kaisha, Tokyo, Japan

[21] Appl. No.: 589,949

[22] Filed: Jan. 23, 1996

[30] Foreign Application Priority Data

Jan. 31, 1995 [JP] Japan .................................... 7-013808

[51] Int. Cl.$^6$ .................................................... B23K 26/08
[52] U.S. Cl. ................................ 219/121.67; 219/121.72; 364/474.08
[58] Field of Search ...................... 219/121.6, 121.61, 219/121.62, 121.67, 121.7, 121.71, 121.72, 121.78, 121.84, 121.85, 121.83; 364/474.08

[56] References Cited

U.S. PATENT DOCUMENTS

| | | | |
|---|---|---|---|
| 5,182,434 | 1/1993 | Nakata | 219/121.72 |
| 5,444,211 | 8/1995 | Nakata et al. | 219/121.67 |
| 5,585,018 | 12/1996 | Kanaoka et al. | 219/121.72 |
| 5,607,606 | 3/1997 | Mori et al. | 219/121.67 |

FOREIGN PATENT DOCUMENTS

| | | |
|---|---|---|
| 4400198 | 9/1994 | Germany. |
| 1-237801 | 9/1989 | Japan. |
| 2-30388 | 1/1990 | Japan. |
| 2-205284 | 8/1990 | Japan. |
| 327752 | 3/1991 | Japan. |
| 3-210981 | 9/1991 | Japan. |
| 4-361885 | 12/1992 | Japan. |

*Primary Examiner*—Gregory L. Mills
*Attorney, Agent, or Firm*—Sughrue, Mion, Zinn, Macpeak & Seas, PLLC

[57] ABSTRACT

A work command section receives a command based on a work program from a program analysis section and outputs a work command for operating a laser oscillator and a laser beam machine, and receives a preliminary work command from a preliminary work command section and generates a work command for preliminary work in conjunction with the preliminary work command section and outputs the command following a piercing work command.

11 Claims, 18 Drawing Sheets

SOLID LINE: MOVE WITH IRRADIATION WITH LASER BEAM
BROKEN LINE: MOVE WITH LASER BEAM STOPPED
ALTERNATE LONG AND TWO SHORT DASHES LINE: PROGRAMMED MOVE

SOLID LINE: MOVE WITH IRRADIATION WITH LASER BEAM
BROKEN LINE: MOVE WITH LASER BEAM STOPPED
ALTERNATE LONG AND TWO SHORT DASHES LINE: PROGRAMMED MOVE

SOLID LINE: MOVE WITH IRRADIATION WITH LASER BEAM
BROKEN LINE: MOVE WITH LASER BEAM STOPPED
ALTERNATE LONG AND TWO SHORT DASHES LINE: PROGRAMMED MOVE

SOLID LINE: MOVE WITH IRRADIATION WITH LASER BEAM
BROKEN LINE: MOVE WITH LASER BEAM STOPPED
ALTERNATE LONG AND TWO SHORT DASHES LINE: PROGRAMMED MOVE

FIG. 12

| PRELIMINARY WORK CONTROL | | 1/0 (EFFECTIVE/INEFFECTIVE) |
|---|---|---|
| DISTANCE L1 | | ℓ1 |
| TIME T1 | | t1 |
| TIME T2 | | t2 |
| FIRST CONDITION GROUP (PIERCING) | LASER OUTPUT | s1 |
| | DUTY | d1 |
| | FREQUENCY | f1 |
| | PIERCING TIME | p1 |
| | ... | |
| SECOND CONDITION GROUP (PRELIMINARY WORK) | LASER OUTPUT | s2 |
| | DUTY | d2 |
| | FREQUENCY | f2 |
| | WORK SPEED | v2 |
| | ... | |
| THIRD CONDITION GROUP (CUTTING) | LASER OUTPUT | s3 |
| | DUTY | d3 |
| | FREQUENCY | f3 |
| | WORK SPEED | v3 |
| | ... | |
| ... | | ... |

SOLID LINE: MOVE WITH IRRADIATION WITH LASER BEAM
ALTERNATE LONG AND TWO SHORT DASHES LINE: PROGRAMMED MOVE

SOLID LINE: MOVE WITH IRRADIATION WITH LASER BEAM
BROKEN LINE: MOVE WITH LASER BEAM STOPPED
ALTERNATE LONG AND TWO SHORT DASHES LINE: PROGRAMMED MOVE

FIG. 18   PRIOR ART

| | | |
|---|---|---|
| PRELIMINARY WORK CONTROL | 1/0 (EFFECTIVE/INEFFECTIVE) | |
| DISTANCE L1 | $\ell 1$ | |
| TIME 1 | t1 | |
| TIME 2 | t2 | |
| TERMINATION PORTION CONDITION CONTROL | 1/0 (EFFECTIVE/INEFFECTIVE) | |
| DISTANCE L2 | $\ell 2$ | |
| UNCUT PART REMAINING CONTROL IN TERMINATION PORTION | 1/0 (EFFECTIVE/INEFFECTIVE) | |
| DISTANCE L3 | $\ell 3$ | |
| FIRST CONDITION GROUP (PIERCING) | LASER OUTPUT | s1 |
| | DUTY | d1 |
| | FREQUENCY | f1 |
| | PIERCING TIME | p1 |
| | ... | |
| SECOND CONDITION GROUP (PRELIMINARY WORK) | LASER OUTPUT | s2 |
| | DUTY | d2 |
| | FREQUENCY | f2 |
| | WORK SPEED | v2 |
| | ... | |
| THIRD CONDITION GROUP (CUTTING) | LASER OUTPUT | s3 |
| | DUTY | d3 |
| | FREQUENCY | f3 |
| | WORK SPEED | v3 |
| | ... | |
| FOURTH CONDITION GROUP (END WORK) | LASER OUTPUT | |
| | DUTY | |
| | FREQUENCY | |
| | WORK SPEED | |
| | ... | |

Labels: 32, 33, 34, 35, 40, 41, 42, 43

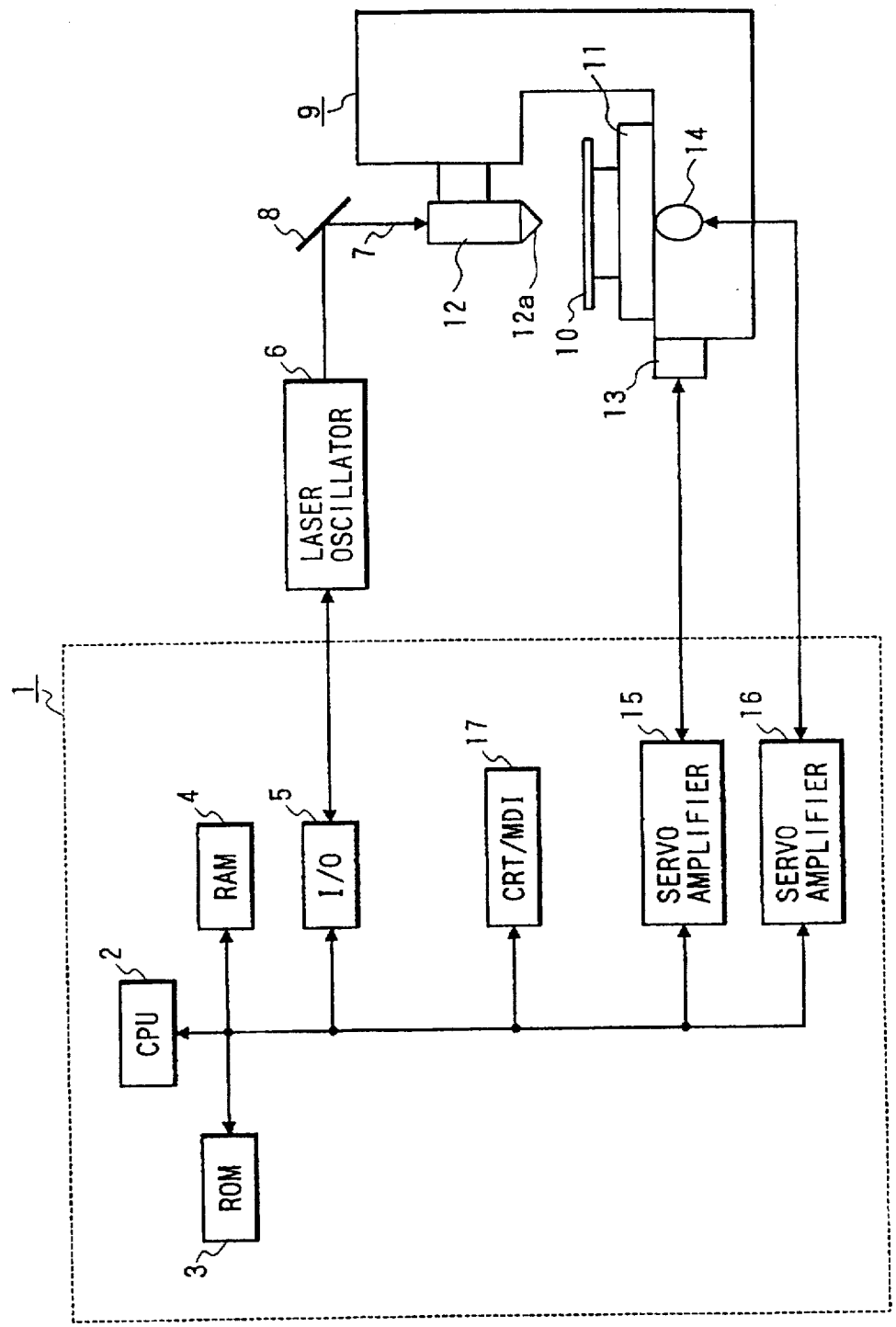

WORK PROGRAM EXAMPLE

N01 M101:   →SELECT PIERCING CONDITIONS

N02 M120:   →EXECUTE PIERCING

N03 M103:   →SELECT CUTTING CONDITIONS

N04 G1X100: ⎤
            ⎬ →MOVE IN RESPONSE TO CUT FORM
N98 G1Y100: ⎦

N99 M121:   →TERMINATE CUTTING
             (TURN OFF LASER BEAM AND WORK GAS)

WORK PROCESS FLOW

LASER BEAM MACHINING SYSTEM AND METHOD USING PRELIMINARY WORK COMMANDS

BACKGROUND OF THE INVENTION

This invention relates to a laser beam machining system using a laser beam for cutting a workpiece and more particularly to improvements in work failure when the transition is made from piercing to cutting and in work failure at the final cutting time.

FIG. 19 is a block diagram showing the configuration of an entire laser beam machine system, wherein numeral 1 is a controller for controlling the entire laser beam machining system. The controller 1 consists of a CPU (central processing unit) 2 which serves as a nucleus of control, a ROM 3 storing a control program, a RAM 4 storing work programs and work condition data, an I/O unit 5 for converting a control signal output from the CPU 2 and sending the resultant control signal to a laser oscillator 6 (described below) and inputting information fed back from the laser oscillator 6, servo amplifiers 15 and 16 for converting a control signal from the CPU 2 and supplying the resultant signal to servo motors 13 and 14 of a laser beam machine 9 (described below) and inputting information fed back from the servo motors 13 and 14, and a CRT/MDI unit 17 for inputting information for giving commands to the laser beam machining system and setting parameters for the system.

In the controller 1, based on control program procedures stored in the ROM 3, the CPU 2 reads a work program, work condition data, etc., stored in the RAM 4 (memory), performs corresponding processing, and transmits process signals via the I/O unit 5, the servo amplifiers 15 and 16, etc., to the laser oscillator 6 and the laser beam machine 9 for controlling the entire laser beam machining system.

Numeral 6 is the above-mentioned laser oscillator, which inputs control signals output from the I/O unit 5 of the controller 1 and performs emission, stopping, laser output change, etc., of a laser beam 7. This laser beam 7 is sent via a mirror 8 to the laser beam machine 9.

Numeral 9 is the above-mentioned laser beam machine, which consists of a table to which a workpiece 10 is fixed, a work head 12 for irradiating the workpiece 10 with a laser beam, and servo motors 13 and 14 for performing move control of the table 11 in two directions of X and Y axes. The laser beam 7 introduced into the work head 12 is gathered by a light gatherer disposed in the work head 12 and is applied to the workpiece 10 through a nozzle 12a.

At the same time, a work gas (not shown) is also sprayed to the workpiece through the nozzle 12a. The servo motors 13 and 14 are connected to the servo amplifiers 15 and 16 respectively and are subjected to rotation control in response to control signals output from the servo amplifiers 15 and 16. A move system in the Z axis direction for controlling the focus position of the laser beam 7 also exists, but here is omitted.

The conventional laser beam machining system having the configuration comprises the functions shown in FIG. 20 as a functional block diagram. It executes a work program, for example, shown in FIG. 21A according to a work process flow shown in FIG. 21B. The configuration of the functional blocks and an outline of the work program will be discussed and the operation will also be discussed with reference to FIGS. 19, 20, and 21.

A program analysis section 18, which consists of the CPU 2, the ROM 3, the RAM 4, etc., analyzes the contents of the work program in accordance with a control program procedure and outputs the analysis result as move information or work condition information.

A move command section 19 consists of the CPU 2, the servo amplifiers 13 and 14, etc. When receiving a move command from the program analysis section 18, the move command section 19 generates and outputs the travel distance in response to the programmed path and the speed set as the work condition.

A work condition command section 20 consists of the CPU 2, the I/O unit 5, etc. When receiving a work condition command from the program analysis section 18, the work condition command section 20 calls conditions responsive to the command of the program analysis section 18 from a work condition registration section 21 and sets and outputs work conditions. If work condition values are specified directly in the program, the values are set in the work conditions and output.

The work condition registration section 21, which consists of the RAM 4, the CRT/MDI unit 17, etc., has a condition input section and an input condition storage section and outputs data in response to a request.

Move and work condition commands output from the move command section 19 and the work condition command section 20 are input to the laser oscillator 6 and the laser beam machine 9, which then operate based on the input commands.

The work program shown in FIG. 21A is an example program from piercing condition selection to completion of cutting to a setup shape. In the work program, the command on line N01 means a piercing condition selection command, the command on line N02 means a piercing execution command, the command on line N03 means a cutting condition selection command, the commands on lines N04 to N98 (command lines N05–N97 are not shown) mean cutting execution commands in response to the cut shape, and the command on line N99 means a command for terminating the cutting and turning off the laser beam and work gas.

FIG. 21B is a work process flowchart corresponding to the work program shown in FIG. 21A. The operation of the laser beam machining system will be discussed along FIG. 21B.

At step S100, based on a command output by the program analysis section 18 from the processing result of the work program line N01, the work condition command section 20 calls and sets piercing conditions appropriate for the workpiece 10 from the work condition data such as laser output stored in the work condition registration section 21 (RAM 4).

At step S101, based on a command output by the program analysis section 18 from the processing result of the work program line N02, the work condition command section 20 issues a command signal for irradiating the workpiece 10 with the laser beam 7 according to the piercing conditions set at step S100 to the laser oscillator 6, which then outputs the laser beam 7 based on the command.

At step S102, based on a work condition selection command output by the program analysis section 18 from the processing result of the work program line N03, the work condition command section 20 calls and sets cutting conditions appropriate for the workpiece 10 from the work condition data such as laser output stored in the work condition registration section 21 (RAM 4).

At step S103, based on move commands output by the program analysis section 18 from the processing result of the work program lines N04 to N98, the move command section 19 selects cutting speed stored in the work condition registration section 21 (RAM 4) and outputs a command for driving the servo motors for moving the table at the selected cutting speed to the laser beam machine 9, which then executes laser beam machining based on the command. Resultantly, the workpiece 10 is cut to the desired shape.

At step S104, based on a cutting end command output by the program analysis section 18 from the processing result of the work program line N99, the work condition command section 20 issues a command for turning off the laser beam and work gas to the laser oscillator 6, which then executes the command. Working of one workpiece is now complete.

Thus, to laser-cut a plate, etc., the laser beam machining system normally pierces the plate, etc., first at the cutting start point, then cuts it to a desired shape.

However, it is known that work failure easily occurs when the transition is made from piercing to cutting because heat accumulates in the workpiece 10 at the piercing time and because when the cutting is started, a flow of molten metal is poor. This tendency is remarkable particularly with material hard to work, such as thick soft steel material.

FIG. 22 is an illustration showing how a thick plate is laser-cut, wherein the hatched portion is an already cut portion. When cutting of the workpiece 10 by the laser beam 7 proceeds, a bottom face 10b of the workpiece 10 lags in the cutting progress behind a top face 10a (lag amount m). The thicker the workpiece 10 and the faster the work speed, the larger the lag amount m.

FIG. 23 is an illustration as to how the lag amount m varies when the plate thickness and cutting speed are changed by taking plate thicknesses of soft steel material, 12 mm and 19 mm, as an example.

Since bottom face cutting lags behind top face cutting, when the workpiece is worked on at a predetermined cutting speed, molten substance on the top face of the workpiece flows in the backward direction. However, when the transition to cutting is made just after piercing, a sufficient gap to allow the molten substance to flow is not produced by normal piercing alone. Therefore, work failure easily occurs. If the cut termination point is reached in a state in which the bottom face cutting lags behind the top face cutting of the workpiece 10, a slight uncut portion remains in the bottom face although the top face is completely cut. If a laser beam is furthermore applied in the state, it concentrates on the slight uncut portion, which then is overheated and molten at a time, a trace of which remains on the cut surface, degrading the quality.

On the other hand, known are countermeasures disclosed in Japanese Patent Laid-Open No. Hei 3-66488 wherein the laser beam focus position is set on the surface of a workpiece and the laser beam is applied to the workpiece, then the focus position is moved for high-precision piercing and disclosed in Japanese Utility Model Publication No. Hei 3-27752 wherein a pierced hole is extended. However, if the plate thickness exceeds 12 mm, the countermeasures also have a small effect on improvement in the molten metal flow.

As disclosed in Japanese Patent Laid-Open No. Hei 6-675, a method is available wherein when the transition is made from piercing to cutting, work conditions are changed continuously like steps, then normal work conditions are entered. However, optimum conditions for thick plates often have no continuity and it is difficult to stably work on a workpiece while allowing molten metal to flow.

As a method for preventing the cut end portion from being molten and dropped, cutting may be stopped before the cut end portion is molten and dropped for producing an intended uncut remaining portion (microjoint). In the method, the cut termination point is set to a position where an uncut remaining portion can be produced in a work program. However, since a proper microjoint width varies depending on the cutting speed and laser output, program preparation is a demanding task. To change the microjoint width after actual work, program edit is also a demanding task.

SUMMARY OF THE INVENTION

It is therefore an object of the invention to provide a laser beam machining system which can prevent work failure from occurring when the transition from piercing to cutting is made and work failure at the cut termination time without preparing any complicated work program.

To the end, according to the invention, there is provided a laser beam machining system comprising a laser beam machining system comprising:

a controller, a laser oscillator for generating and outputting a laser beam upon reception of a work command for laser oscillation from the controller, and a laser beam machine for receiving the laser beam, gathering it, and irradiating a workpiece with the gathered laser beam, upon reception of a work command for a work path move from the controller, the laser beam machine for causing the workpiece to make a relative move to a work head, the controller comprising a program analysis section for analyzing a work program in accordance with a control program procedure and generating and outputting work program commands, a work condition registration section for storing work condition data of piercing, preliminary work, cutting, etc., and selectively outputting the work condition data in response to a request, a work command section, upon reception of the work program command, for calling the corresponding work condition data from the work condition registration section and generating and outputting the work command for laser oscillation and the work command for a work path move, and a preliminary work command section for detecting a piercing instruction of the work program analyzed by the program analysis section, generating a preliminary work command signal, and outputting it to the work command section, when processing a predetermined amount of work program commands following a work program command based on the piercing instruction in conjunction with the work command section and generating a work command, the preliminary work command section for replacing specified work condition data with preliminary work condition data and generating a preliminary work command, then generating a work command for returning the work position to the piercing position with laser oscillator output zero and causing the work command section to output the command.

The preliminary work command section in the laser beam machining system comprises a work hole determination section for detecting the piercing instruction of the work program analyzed by the program analysis section, generating a preliminary work command signal, and outputting it to the work command section for causing the work command section to call preliminary work condition data from the work condition registration section and generate and output a preliminary work command with the preliminary work condition data from a cutting program command output from the program analysis section, a move distance calculation section for adding up work path move distances for cutting from the preliminary work command generated by the work command section upon reception of the preliminary work command signal and outputting the result value, a distance setting section for outputting distance L1 for preliminary work preset therein in response to a request, and a move distance comparison section, upon reception of the result value, for calling the distance L1 and comparing it with the result value, if they match, the move distance comparison section for outputting a preliminary work distance match signal to the work command section for causing the work command section to terminate generation of the preliminary work command and generate a work command given to the laser oscillator with laser output zero and a work command given to the laser beam machine returning to the piercing position, then return to motion in accordance with the cutting work program commands.

According to the invention, there is provided a laser beam machining method for irradiating a workpiece making a relative move in accordance with a work program with a laser beam for cutting the workpiece, the method comprising the steps of piercing the workpiece at a start point of cutting in accordance with the contents specified in the work program, executing preliminary work on the workpiece on a work path specified in work program steps following specification of the piercing or a work path in a reverse direction to that work path at a predetermined distance L1 under preliminary work conditions not specified in the work program after the piercing, performing operation, not specified in the work program, for stopping the laser beam irradiation and returning the work position to the piercing position, and starting cutting the workpiece in accordance with the contents specified in the work program steps following the piercing specification.

According to the invention, there is provided a laser beam machining system comprising a controller, a laser oscillator for generating and outputting a laser beam upon reception of a work command for laser oscillation from the controller, and a laser beam machine for receiving the laser beam, gathering it, and irradiating a workpiece with the gathered laser beam, upon reception of a work command for a work path move from the controller, the laser beam machine for causing the workpiece to make a relative move to a work head, the controller comprising a program analysis section for analyzing a work program in accordance with a control program procedure and generating and outputting work program commands, a work condition registration section for storing work condition data of piercing, preliminary work, cutting, etc., and selectively outputting the work condition data in response to a request, a work command section, upon reception of the work program command, for calling the corresponding work condition data from the work condition registration section and generating and outputting work commands for operating the laser oscillator and the laser beam machine, a preliminary work command section for detecting a piercing instruction of the work program analyzed by the program analysis section, generating a preliminary work command signal, and outputting it to the work command section, when processing work program commands following a work program command based on the piercing instruction in conjunction with the work command section and generating work commands, the preliminary work command section for generating preliminary work commands comprising a work command generated by replacing specified work condition data with preliminary work condition data and a work command for returning the work position to the piercing position with laser oscillator output zero and causing the work command section to output the preliminary work commands, and a cooling command section for inputting the work command with laser oscillator output zero generated and output by the work command section and the preliminary work command section in conjunction with each other and after a lapse of a predetermined time, outputting a cooling end signal to the work command section for causing the work command section to return to the operation in accordance with work program commands following the work program command based on the piercing instruction.

The cooling command section in the laser beam machining system comprises a beam stop timer, upon reception of the work command with laser oscillator output zero generated by the work command section and the preliminary work command section in conjunction with each other and output from the work command section, for starting counting up the cooling time and outputting the count time, a time setting section in which time T1 for stopping oscillation of the laser oscillator is previously stored, and a stop time comparison section, upon reception of the count time output from the beam stop timer, for comparing the time with the time T1 called from the time setting section, if they match, the stop time comparison section for outputting a cooling end signal to the work command section for causing the work command section to return to the operation in accordance with the work program commands following the work program command based on the piercing instruction.

According to the invention, there is provided a laser beam machining method for irradiating a workpiece making a relative move in accordance with a work program with a laser beam for cutting the workpiece, the method comprising the steps of piercing the workpiece at a start point of cutting in accordance with the contents specified in the work program, executing preliminary work on the workpiece on a work path specified in work program steps following specification of the piercing or a work path in a reverse direction to that work path at a predetermined distance L1 under preliminary work conditions not specified in the work program after the piercing, performing operation, not specified in the work program, for stopping the laser beam irradiation and returning the work position to the piercing position, performing operation, not specified in the work program, for cooling the workpiece for a predetermined time T1 after the laser beam irradiation is stopped, and starting cutting the workpiece in accordance with the contents specified in the work program steps following the piercing specification.

According to the invention, there is provided a laser beam machining system comprising a controller, a laser oscillator for generating and outputting a laser beam upon reception of a work command for laser oscillation from the controller, and a laser beam machine for receiving the laser beam, gathering it, and irradiating a workpiece with the gathered laser beam, upon reception of a work command for a work path move from the controller, the laser beam machine for causing the workpiece to make a relative move to a work head, the controller comprising a program analysis section for analyzing a work program in accordance with a control program procedure and generating and outputting work program commands, a work condition registration section for storing work condition data of piercing, preliminary work, cutting, etc., and selectively outputting the work condition data in response to a request, a work command section, upon reception of the work program command, for calling the corresponding work condition data from the work condition registration section and generating and outputting work commands for operating the laser oscillator and the laser beam machine, a preliminary work command section for detecting a piercing instruction of the work program analyzed by the program analysis section, generating a preliminary work command signal, and outputting it to the work command section, when processing work program commands following a work program command based on the piercing instruction in conjunction with the work command section and generating work commands, the preliminary work command section for generating preliminary work commands comprising a work command generated by replacing specified work condition data with preliminary work condition data and a work command for returning the work position to the piercing position with laser oscillator output zero and causing the work command section to output the preliminary work commands, a cooling command section for inputting the work command with laser oscillator output zero generated and output by the work command section and the preliminary work command section in conjunction with each other and after a lapse of a predetermined time, outputting a cooling end signal to the work command section for causing the work command section to generate and output a work command for laser beam irradiation, and a beam stabilization command section, after a lapse of a predetermined time since reception of a cooling preliminary work end signal output when the work command section receives the cooling end signal and generates the work command for laser beam irradiation, for outputting a beam stabilization signal to the work command section for causing the work command section to return to the operation in accordance with the work program commands following the work program command based on the piercing instruction.

The beam stabilization command section in the laser beam machining system comprises a beam irradiation timer, upon reception of the cooling preliminary work end signal output from the work command section, for counting up the elapsed time and outputting the count, a time setting section in which time T2 for continuing laser output is previously stored, and an irradiation time comparison section, upon reception of the count from the beam irradiation timer, for calling the time T2 from the time setting section and comparing the count with the time T2, if they match, the irradiation time comparison section for outputting a beam stabilization signal.

According to the invention, there is provided a laser beam machining method for irradiating a workpiece making a relative move in accordance with a work program with a laser beam for cutting the workpiece, the method comprising the steps of:

piercing the workpiece at a start point of cutting in accordance with the contents specified in the work program, executing preliminary work on the workpiece on a work path specified in work program steps following specification of the piercing or a work path in a reverse direction to that work path at a predetermined distance L1 under preliminary work conditions not specified in the work program after the piercing, performing operation, not specified in the work program, for stopping the laser beam irradiation and returning the work position to the piercing position, performing operation, not specified in the work program, for cooling the workpiece for a predetermined time T1 after the laser beam irradiation is stopped, performing operation at the position after the cooling, not specified in the work program, for executing laser beam oscillation for a predetermined time T2 to stabilize laser output, and starting cutting the workpiece in accordance with the contents specified in the work program steps following the piercing specification.

According to the invention, there is provided a laser beam machining system comprising a controller, a laser oscillator for generating and outputting a laser beam upon reception of a work command for laser oscillation from the controller, and a laser beam machine for receiving the laser beam, gathering it, and irradiating a workpiece with the gathered laser beam, upon reception of a work command for a work path move from the controller, the laser beam machine for causing the workpiece to make a relative move to a work head, the controller comprising a program analysis section for analyzing a work program in accordance with a control program procedure and generating and outputting work program commands, a work condition registration section for storing work condition data of piercing, preliminary work, cutting, end work, etc., and selectively outputting the work condition data in response to a request, a work command section, upon reception of the work program command, for calling the corresponding work condition data from the work condition registration section and generating and outputting work commands for operating the laser oscillator and the laser beam machine, and an end work correction command section for detecting a cut termination instruction of the work program analyzed by the program analysis section, generating an end work correction command signal, and outputting it to the work command section, in conjunction with the work command section, the end work correction command section for generating a work command for end work correction and causing the work command section to output the work command and return to the operation based on work program commands for the cut termination instruction output from the program analysis section.

The end work correction command section in the laser beam machining system comprises a cut termination determination section for detecting the cut termination instruction analyzed by the program analysis section, generating the end work correction command signal, and outputting it to the work command section for causing the work command section to call and set end work condition data from the work condition registration section and correct a specified portion of an end work command with the end work condition data, a remaining distance calculation section for receiving the end work correction command signal and a work command specifying a work path move preceding the cut termination instruction output from the work command section and calculating and outputting a remaining distance until the cutting is complete, a distance setting section in which end work correction distance L2 is set, and a remaining distance comparison section, upon reception of the remaining distance until the cutting is complete, output from the remaining distance calculation section, for calling the distance L2 from the distance setting section and comparing the remaining distance with the distance L2, if they match, the remaining distance comparison section for generating an end correction start signal and outputting it to the work command section for causing the work command section to correct the end work command.

According to the invention, there is provided a laser beam machining method for irradiating a workpiece making a relative move in accordance with a work program with a laser beam for cutting the workpiece, the method comprising the steps of cutting the workpiece to a predetermined distance before a termination point of the cutting in accordance with the contents specified in the work program, and cutting the workpiece by correcting a work path specified in the work program under end work conditions not specified in the work program from the predetermined distance before the termination point to the termination point.

In the controller (aspect 1), the preliminary work command section detects a piercing instruction of the work program analyzed by the program analysis section, and in conjunction with the work command section, generates a work command by replacing a predetermined amount of work program commands with preliminary work condition data, then generates a work command for returning the work position to the piercing position with laser oscillator output zero and causes the work command section to output the command.

In the preliminary work command section in the controller (aspect 2), the work hole determination section detects the piercing instruction of the work program analyzed by the program analysis section, generates a preliminary work command signal, and outputs it to the work command section for causing the work command section to call preliminary work condition data from the work condition registration section and generate and output a preliminary work command with the preliminary work condition data from a cutting program command output from the program analysis section, and if the work path move distance for cutting matches the preliminary work distance L1, the move distance comparison section outputs a preliminary work distance match signal to the work command section for causing the work command section to terminate generation of the preliminary work command and generate a work command given to the laser oscillator with laser output zero and a work command given to the laser beam machine returning to the piercing position, then return to motion in accordance with the cutting work program commands.

In the second to fourth steps of the laser beam machining method (aspect 3), preliminary work is executed on the workpiece at the predetermined distance L1 under preliminary work conditions not specified in the work program prior to cutting after piercing, and the work position is returned to the piercing position.

In the controller (aspect 4), the preliminary work command section detects the piercing instruction of the work program analyzed by the program analysis section, and in conjunction with the work command section, generates a work command by replacing a predetermined amount of work program commands with preliminary work condition data, then generates a work command for returning the work position to the piercing position with laser oscillator output zero and causes the work command section to output the command, and after a lapse of the predetermined time since reception of the work command with laser oscillator output zero, the cooling command section outputs a cooling end signal to the work command section for causing the work command section to return to the operation in accordance with work program commands following the work program command based on the piercing instruction.

In the controller (aspect 5), the preliminary work command section detects the piercing instruction of the work program analyzed by the program analysis section, and in conjunction with the work command section, generates a work command by replacing a predetermined amount of work program commands with preliminary work condition data, then generates a work command for returning the work position to the piercing position with laser oscillator output zero and causes the work command section to output the command, and in the cooling command section, after a lapse of the predetermined time since reception of the work command with laser oscillator output zero on the beam irradiation timer, the irradiation time comparison section outputs a cooling end signal to the work command section for causing the work command section to return to the operation in accordance with work program commands following the work program command based on the piercing instruction.

In the second to fourth steps of the laser beam machining method (aspect 6), preliminary work is executed on the workpiece at the predetermined distance L1 under preliminary work conditions not specified in the work program prior to cutting after piercing, the work position is returned to the piercing position, and the workpiece is cooled for the predetermined time T1.

In the controller (aspect 7), the preliminary work command section detects the piercing instruction of the work program analyzed by the program analysis section, and in conjunction with the work command section, generates a work command by replacing a predetermined amount of work program commands with preliminary work condition data, then generates a work command for returning the work position to the piercing position with laser oscillator output zero and causes the work command section to output the command, and after a lapse of the predetermined time since reception of the work command with laser oscillator output zero, the cooling command section outputs a cooling end signal to the work command section for causing the work command section to terminate the cooling and generate and output a work command for laser beam irradiation. After a lapse of the predetermined time since reception of a cooling preliminary work end signal, the beam stabilization command section outputs a beam stabilization signal to the work command section for causing the work command section to return to the operation in accordance with the work program commands following the work program command based on the piercing instruction.

In the controller (aspect 8), the preliminary work command section measures the laser beam irradiation time after the cooling ends with the beam irradiation timer, and the irradiation time comparison section compares the measured irradiation time with the predetermined time T2. If they match, the irradiation time comparison section outputs a beam stabilization signal to the work command section for causing the work command section to return to the operation in accordance with the work program commands following the work program command based on the piercing instruction.

In the second to fifth steps of the laser beam machining method (aspect 9), preliminary work is executed on the workpiece at the predetermined distance L1 under preliminary work conditions not specified in the work program prior to cutting after piercing, the work position is returned to the piercing position, and the workpiece is cooled for the predetermined time T1, then is irradiated with a laser beam for the predetermined time T2 to stabilize laser oscillation output.

In the controller (aspect 10), the end work correction command section detects a cut termination instruction of the work program analyzed by the program analysis section, and in conjunction with the work command section, replaces a predetermined amount of work commands preceding the cut termination work command with end work condition data for correction.

In the end work correction command section in the controller (aspect 11), the cut termination determination section detects the cut termination instruction of the work program analyzed by the program analysis section, generates the end work correction command signal, and outputs it to the work command section for causing the work command section to call end work condition data from the work condition registration section and correct a predetermined amount of work commands preceding the cut termination work command. The predetermined amount of the work commands to be corrected is determined by the end correction termination signal output by the remaining distance comparison section.

In the second step of the laser beam machining method (aspect 12), the workpiece is worked on at the predetermined distance before the cutting terminates under end work conditions not specified in the work program.

BRIEF DESCRIPTION OF THE DRAWING

In the accompanying drawings:

FIG. 12 is a registered work condition data example showing a fourth embodiment of the invention;

FIG. 18 is a registered work condition data example showing a sixth embodiment of the invention;

FIG. 19 is a block diagram of a laser beam machining system;

DETAILED DESCRIPTION OF THE PREFERRED EMBODIMENTS

Referring now to the accompanying drawings, there are shown preferred embodiments of the invention.

Embodiment 1

Figure 1:
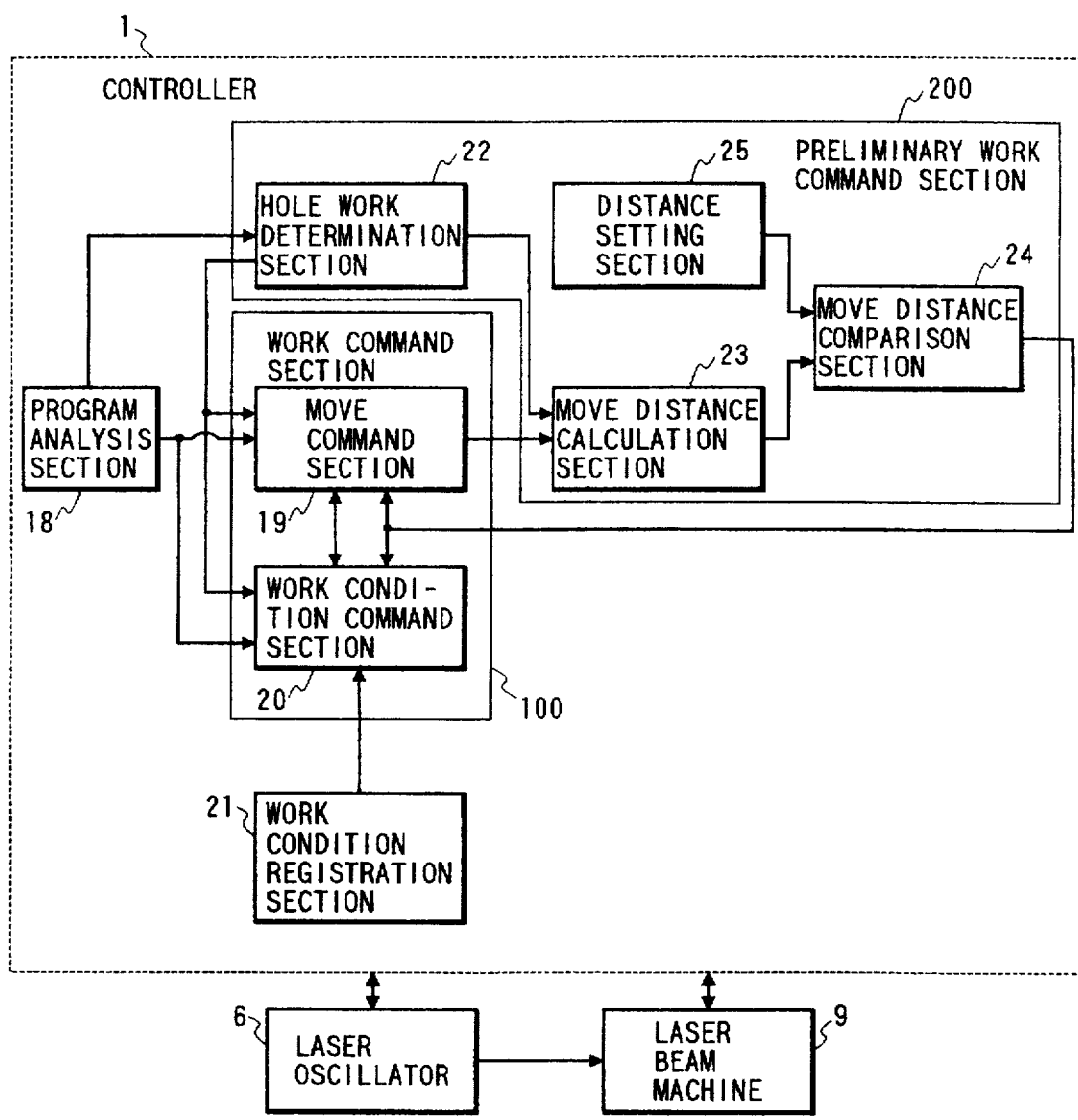
FIG. 1 is a functional block diagram showing a first embodiment of the invention.

FIG. 1 is a functional block diagram of a laser beam machining system according to a first embodiment of the invention. The configuration of the embodiment will be discussed with reference to FIGS. 1 and 19.

The laser beam machining system consists of a controller 1, a laser oscillator 6, and a laser beam machine 9. The laser oscillator 6 and the laser beam machine 9 operate based on commands of the controller 1 and feed back their operation state to the controller 1.

The controller 1 consists of a work command section 100 comprising a program analysis section 18, a work condition registration section 21, a move command section 19, and a work condition command section 20 and a preliminary work command section 200 comprising a hole work determination section 22, a move distance calculation section 23, a move distance comparison section 24, and a distance setting section 25.

The program analysis section 18, which is made up of a CPU 2, a ROM 3 for storing a control program, a RAM 4 for storing work programs, etc., analyzes the contents of a work program according to the control program procedure and outputs the analysis results as work program commands including move path commands, work condition commands, etc.

The work command section 100 comprising the move command section 19 and the work condition command section 20 is made up of the CPU 2, an I/O unit 5, servo amplifiers 15 and 16, etc. Upon reception of a work program command, such as a move path command or a work condition command, output by the program analysis section 18, the work command section 100 calls the work condition data corresponding to the command from the work condition registration section 21. The work condition command section 20 generates and outputs work commands (laser oscillation commands) containing laser output, duty, frequency, etc., for operating the laser oscillator 6. The move command section 19 generates and outputs work commands (laser beam machining commands) containing the amount, speed, etc., for operating servo motors 13 and 14 of the laser beam machine 9.

If work condition values are specified directly in a work program, they are handled as work condition data.

Until completion of preliminary working after reception of a preliminary work command signal (described below) output from the preliminary work command section 200, the work command section 100 in conjunction with the preliminary work command section 200 generates and outputs work commands including a laser oscillation command, laser beam machining command, etc., for preliminary work as discussed below in detail.

The work condition registration section 21 consists of components such as the RAM 4 for storing work condition data and a CRT/MDI unit 17 which serves as an input section and a display section of conditions such as work condition data, and selectively outputs work condition data based on a request made by the work command section 100. The work condition data includes first to fourth condition groups, etc., shown in FIGS. 12 and 18; optimum data is input depending on the material and plate thickness of a workpiece 10.

The preliminary work command section 200 comprising the hole work determination section 22, the move distance calculation section 23, the move distance comparison section 24, and the distance setting section 25 is made up of the CPU 2, the ROM 3, the RAM 4, etc. When detecting an execution command of a piercing instruction step of a work program analyzed by the program analysis section 18 (piercing execution command M120 code on line N02 in the work program example in FIG. 21A), the hole work determination section 22 outputs a preliminary work command signal. Upon reception of the preliminary work command signal, the move distance calculation section 23 adds up laser beam machining command then output from the move command section 19 in the work command section 100 and outputs the result value as a move distance. The move distance comparison section 24 compares the move distance calculated by the move distance calculation section 23 with the distance (L1) set in the distance setting section 25 and if they match, sends a move distance match signal. The distance setting section 25 is provided to set a preliminary work distance for preliminary working and stores the previously registered value L1.

On the other hand, when receiving the preliminary work command signal output by the hole work determination section 22, the work command section 100 calls work condition data for preliminary work from the work condition registration section 21, replaces the work condition data specified in the work condition command after the piercing instruction execution command with the work condition data for preliminary work, and continues to generate and output work commands including a laser oscillation command, laser beam machining command, etc., until reception of the move distance match signal output from the move distance comparison section 24. Upon reception of the move distance match signal, the work command section 100 generates and outputs work commands including a laser oscillation command, laser beam machining command, etc., for setting laser output to zero and returning to the former piercing position and completes the preliminary work command, then returns to the operation in accordance with the work program command (stored until completion of the preliminary work command) output from the program analysis section after the piercing instruction execution command.

The work program, piercing conditions, preliminary work conditions, preliminary work distance L1, and cutting conditions are input to the RAM 4 through the CRT/MDI unit 17.

The operation will be discussed based on a flowchart shown in FIG. 2 by taking the work program shown in FIG. 21A as an example.

Figures 21A, 21B:
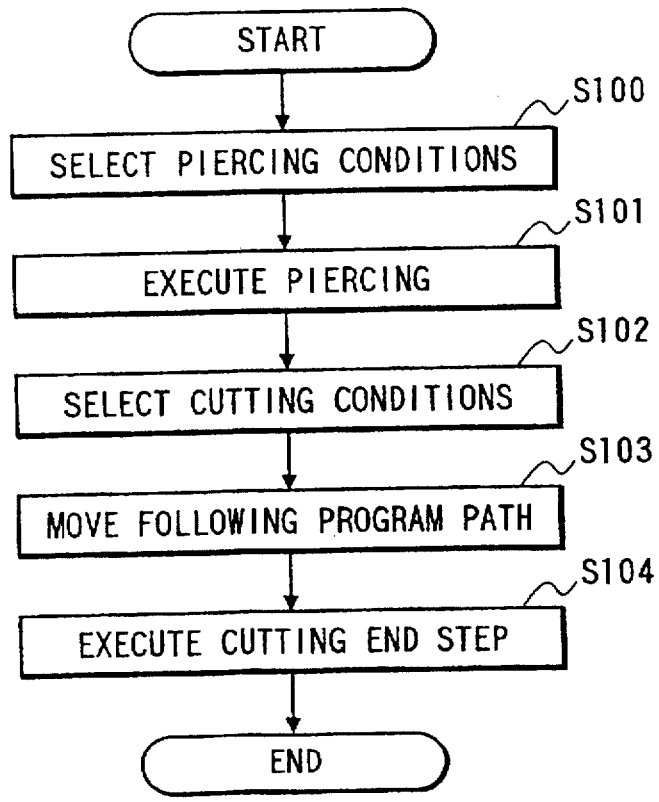
FIGS. 21A and 21B are work program examples for the laser beam machining system and a process flow chart corresponding thereto.
Figure 22:
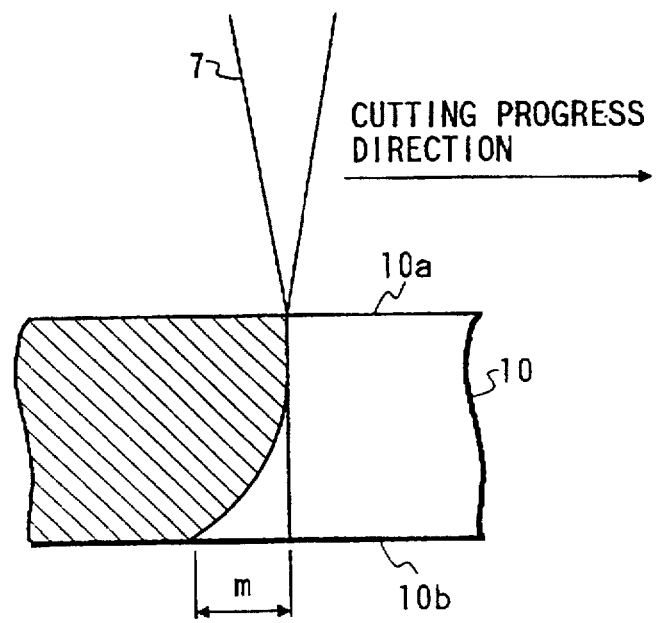
FIG. 22 is a drawing showing how laser beam machining is performed.
Figure 23:
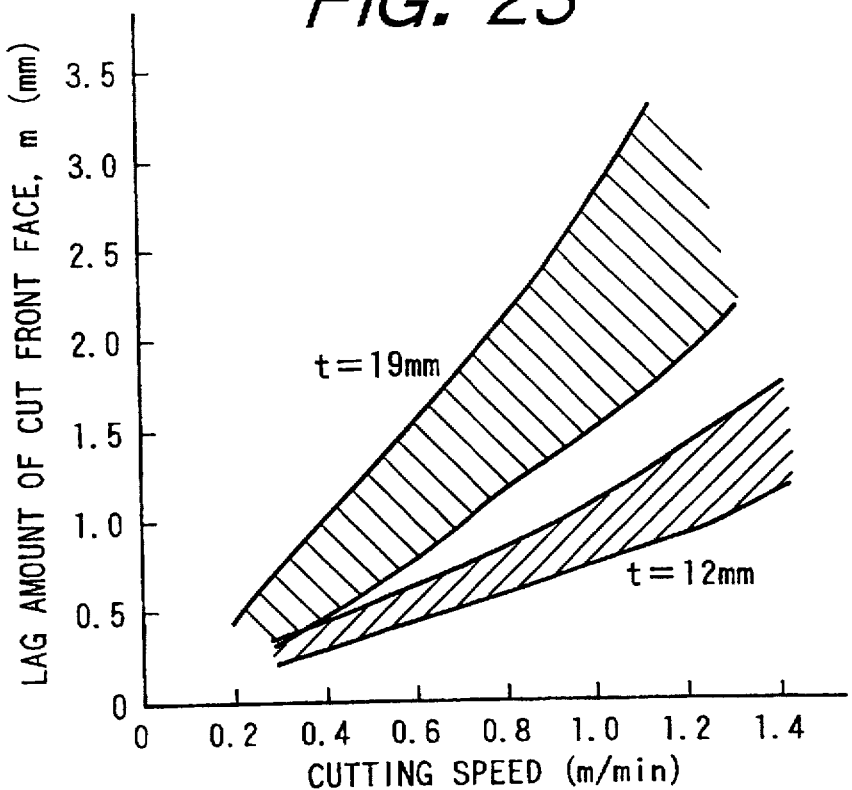
FIG. 23 is a graph showing lag amount change of a front face depending on the plate thickness and cutting speed.

FIG. 21A shows the work program from piercing condition selection to the end of cutting to a setup shape, wherein the instruction on line N01 is a piercing condition selection command, the instruction on line N02 is a piercing execution command, the instruction on line N03 is a cutting condition selection command, the instructions on line N04-N98 are move path commands responsive to the cut shape, and the instruction on line N99 is a cutting end command.

Figure 2:
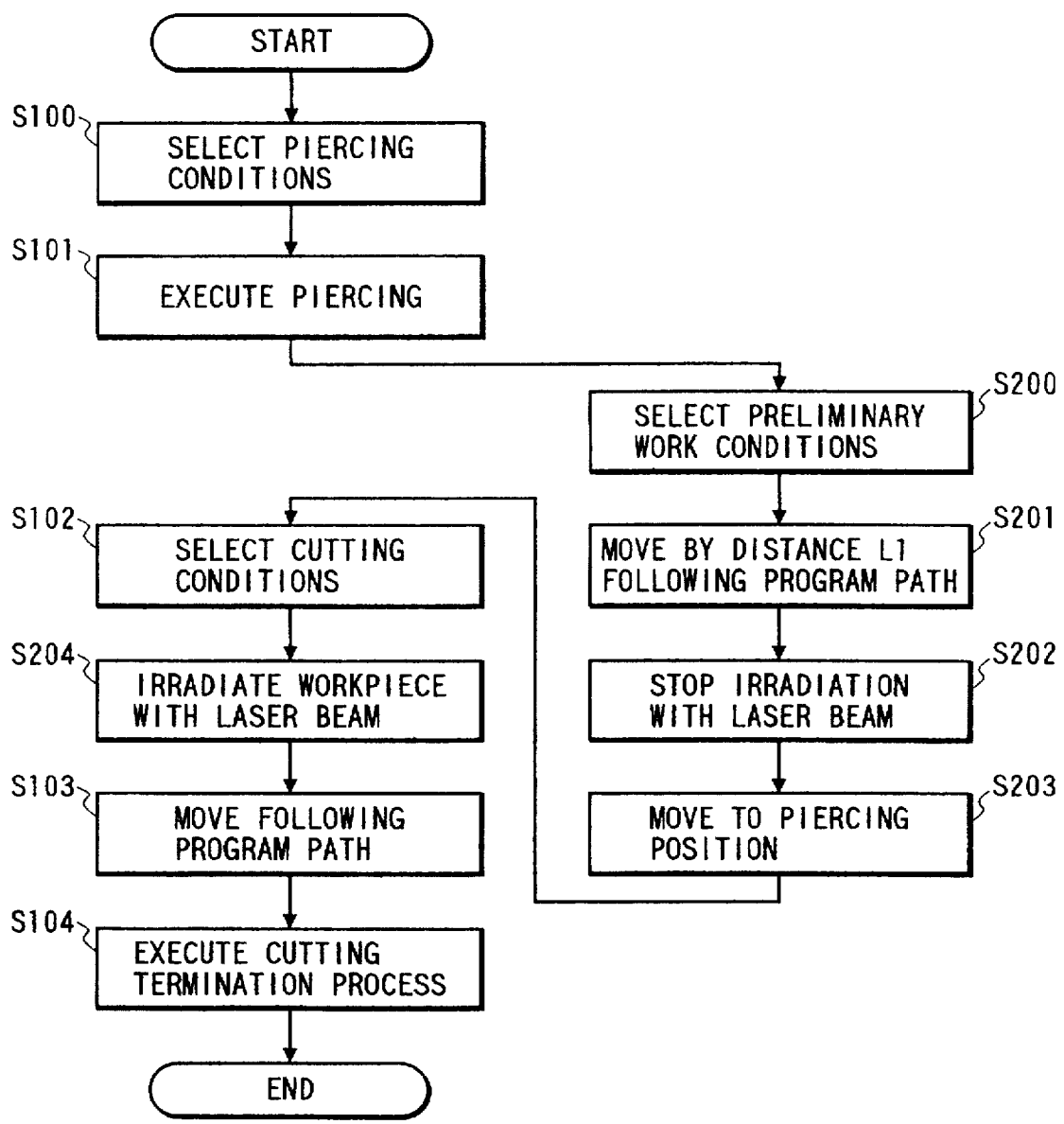
FIG. 2 is a work process flowchart according to the first embodiment of the invention.

FIG. 2 is a process flowchart applied when the work program in FIG. 21A is executed.

At step S100, the program analysis section 18 analyzes the instruction on work program line N01 and outputs a work condition command for selecting piercing conditions to the work command section 100, which then calls the piercing condition data from the work condition registration section 21 and generates and sets a laser oscillation command and a laser beam machining command.

At step S101, the program analysis section 18 analyzes the instruction on work program line N02 and outputs a piercing execution command to the work command section 100, which then outputs the commands generated and set at step S100 to the laser oscillator 6 and the laser beam machine 9, which then executes piercing and upon completion, feeds back completion information to the work command section 100. Receiving the completion information, the work command section 100 performs piercing completion processing. On the other hand, in the preliminary work command section 200, the hole work determination section 22 detects a piercing execution instruction analyzed by the program analysis section 18 and outputs a preliminary work command signal to the move distance calculation section 23 and the work command section 100.

At steps S200-S203, move path and work condition commands output by the program analysis section 18 which analyzes the instructions on work program lines N03 and later are reedited based on preliminary work condition data and output; the steps are executed prior to cutting performed based on regular work program processing.

At step S200, the program analysis section 18 analyzes the instruction on work program line N03 and outputs a work condition command for selecting cutting conditions to the work command section 100, which then calls cutting condition data from the work condition registration section 21 and upon reception of a preliminary work command signal output by the hole work determination section 22 in the preliminary work command section 200, calls preliminary work condition data from the work condition registration section 21 and replaces the cutting condition data with the preliminary work condition data for setting.

At step S201, the program analysis section 18 analyzes the instruction steps on work program lines N04 and later in sequence and outputs a move path command to the work command section 100, which then uses the preliminary work condition data to continue generating and outputting a laser oscillation command and a laser beam machining command until reception of a move distance match signal output from the move distance comparison section 24. On the other hand, receiving the preliminary work command signal, the move distance calculation section starts adding up the laser beam machining command and outputs the result value to the move distance comparison section 24 as the move distance. The move distance comparison section 24 compares the move distance with preliminary work move distance L1 set in the distance setting section 25 and if they match, outputs a move distance match signal to the work command section 100.

At step S202, receiving the move distance match signal, the work command section 100 generates and outputs a laser oscillation command for stopping the laser beam irradiation to the laser oscillator 6, which then stops once the laser beam irradiation (a laser beam irradiation stop signal may be output to the laser oscillator 6 or the output command to the laser oscillator 6 may be set to 0).

At step S203, receiving the move distance match signal, the work command section 100 generates and outputs a laser beam machining command for moving the table and returning the work position to the piercing position to the laser beam machine 9, which then moves the table and returns the work position to the piercing position. Recognizing that the work position has been returned to the piercing position, the system executes preliminary work termination processing.

At step S102, in synchronization with the preliminary work termination processing, the work command section 100 calls and sets the cutting condition data from the work condition registration section 21 based on the cutting condition command output by the program analysis section 18 analyzing the instruction on work program line N03.

At step S204, the work command section 100 generates and outputs a laser oscillation command based on the cutting condition data. Receiving the command, the laser oscillator 6 again starts the laser beam irradiation.

At step S103, the program analysis section 18 analyzes the instructions on work program lines N04 to N98 and outputs a move path command to the work command section 100, which then uses the cutting condition data set at step S102 to generate and output a laser oscillation command containing the work path move speed to the laser beam machine 9, which then drives the servo motors 13 and 14 for moving the table at the specified cutting speed. As a result, the workpiece 10 is cut to the desired shape.

At step S104, the program analysis section 18 analyzes the instruction on work program line N99 and outputs a cutting end command to the work command section 100, which then issues a work condition command for turning off the laser beam and work gas to the laser oscillator 6, which then executes the command. Working of one workpiece is now complete.

Figure 3:
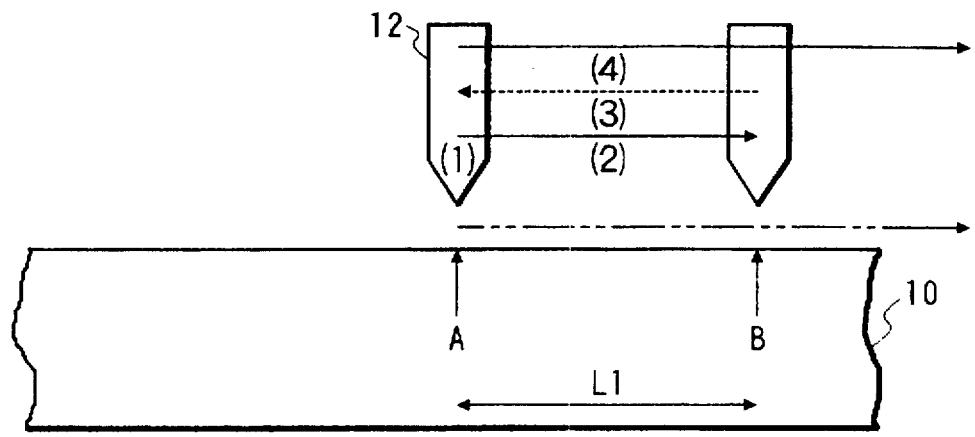
FIG. 3 is a drawing showing how to work on a workpiece according to the first embodiment of the invention.

FIG. 3 shows the work path in the embodiment.
(1) First, execute piercing at position A of workpiece 10;
(2) cut the workpiece 10 by distance L1 following the program path under preliminary work conditions;
(3) stop laser beam irradiation and return to the piercing position A; and
(4) irradiate the workpiece 10 with a laser beam for cutting under the original cutting conditions.

Figure 4:
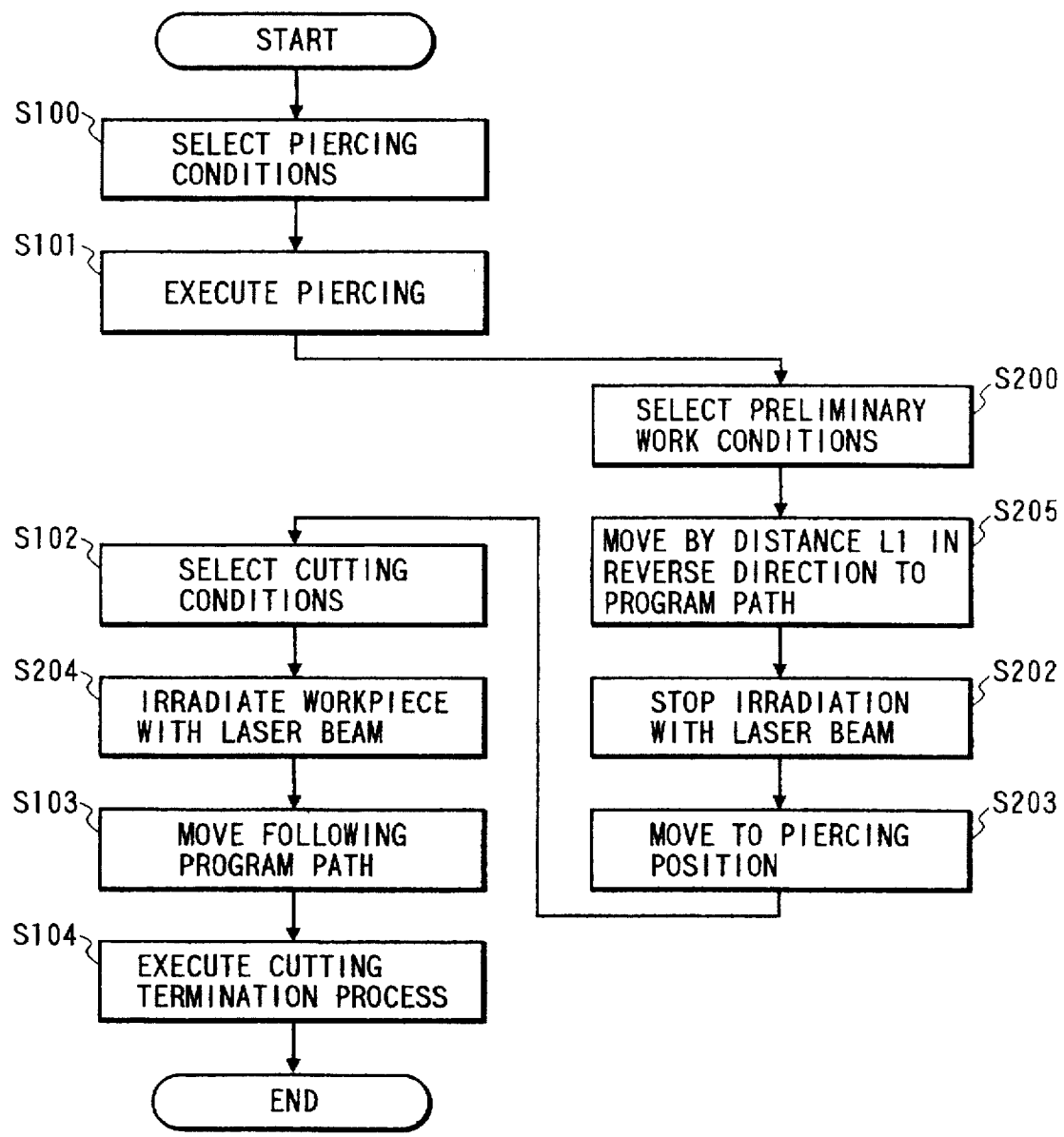
FIG. 4 is a process flowchart according to another form of the first embodiment of the invention.

FIG. 4 is a process flowchart in another form of the embodiment applied when the work program in FIG. 21A is executed. In the form, preliminary work is executed in the reverse direction 180 degrees on the move path shown in the work program in the first embodiment and a return is made to the piercing position. Steps S100 to S104 and S200 to S204 in FIG. 4 are the same as those in FIG. 2.

Step 205 in FIG. 4 differs from step S201 in FIG. 2 only in that the preliminary work progress direction is reverse 180 degrees, and therefore will not be discussed again.

Figure 5:
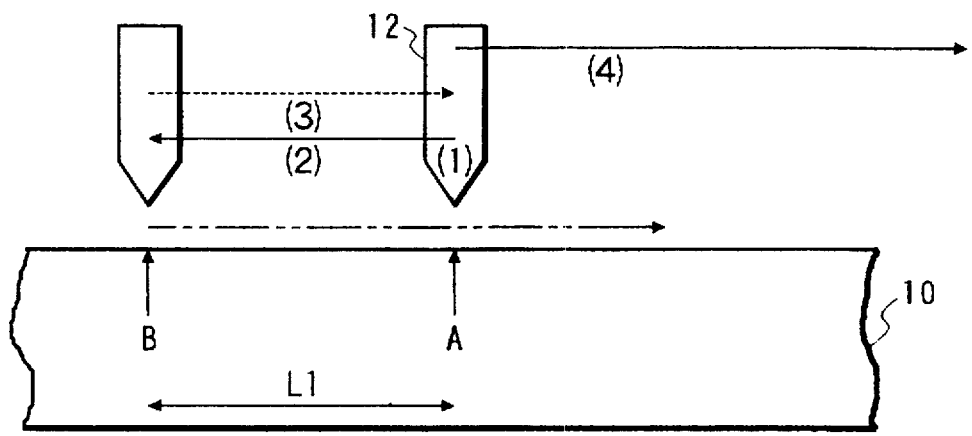
FIG. 5 is a drawing showing how to work on a workpiece according to the form of the first embodiment of the invention in FIG. 4.

FIG. 5 shows the working method in the modified form of the embodiment.
(1) First, execute piercing at position A of workpiece 10;
(2) cut the workpiece 10 by distance L1 in the reverse direction to the programmed direction under preliminary work conditions;
(3) stop laser beam irradiation and return to the piercing position A; and
(4) irradiate the workpiece 10 with a laser beam for cutting in the programmed direction under the original cutting conditions.

According to the embodiment, a groove where molten metal flows can be formed by the preliminary work for smoothing the molten metal flow, thus preventing work failure from occurring when the transition is made form piercing to cutting. Preliminary work need not be described in each work program and if the material and plate thickness are specified, the optimum preliminary work conditions can also be selected, improving the precision and productivity of work program preparation.

Embodiment 2

Figure 6:
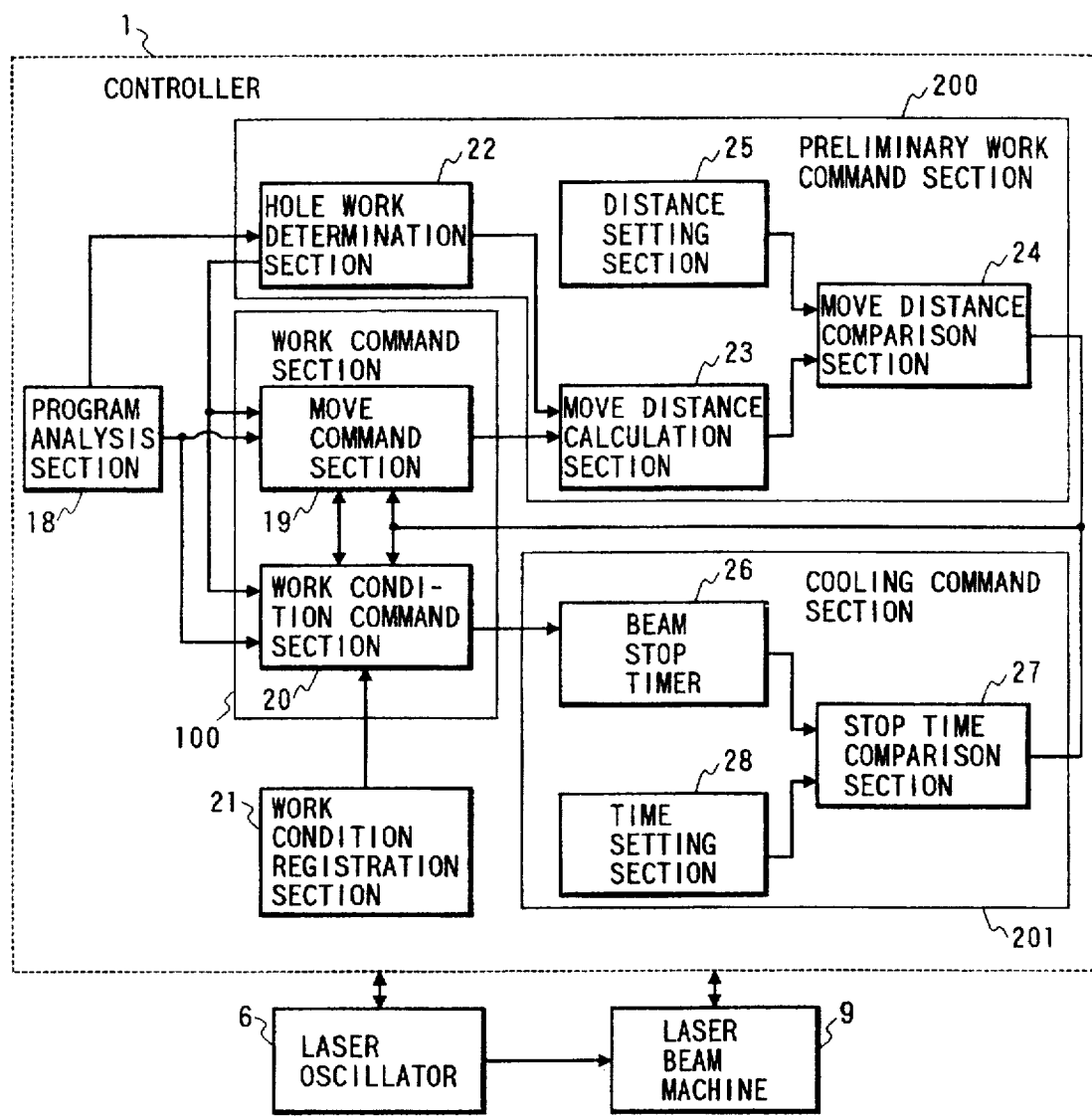
FIG. 6 is a functional block diagram showing a second embodiment of the invention.

FIG. 6 is a functional block diagram of a laser beam machining system according to a second embodiment of the invention. The configuration of the embodiment will be discussed with reference to FIG. 6. Functional blocks identical with or similar to those previously described with reference to FIG. 1 are denoted by the same reference numerals in FIG. 6 and will not be discussed again.

When receiving a preliminary work command signal output from a preliminary work command section 200, a work command section 100 executes preliminary work. When a return is made to piercing position A, the work command section 100 outputs a laser oscillation command for stopping laser beam irradiation to a cooling command section 201, which then operates a beam irradiation stop timer 26 for counting the stop time and outputs the count time to a beam irradiation stop time comparison section 27 as the stop time. The beam irradiation stop time comparison section 27 compares the stop time with time T1 set in a beam irradiation stop time setting section 28 and if they match, sends a stop time match signal to the work command section 100 comprising a move command section 19 and a work condition command section 20. Receiving the stop time match signal, the work command section 100 completes the operation responsive to the preliminary work command section commands and returns to processing of cutting condition commands given by a program analysis section.

Figure 7:
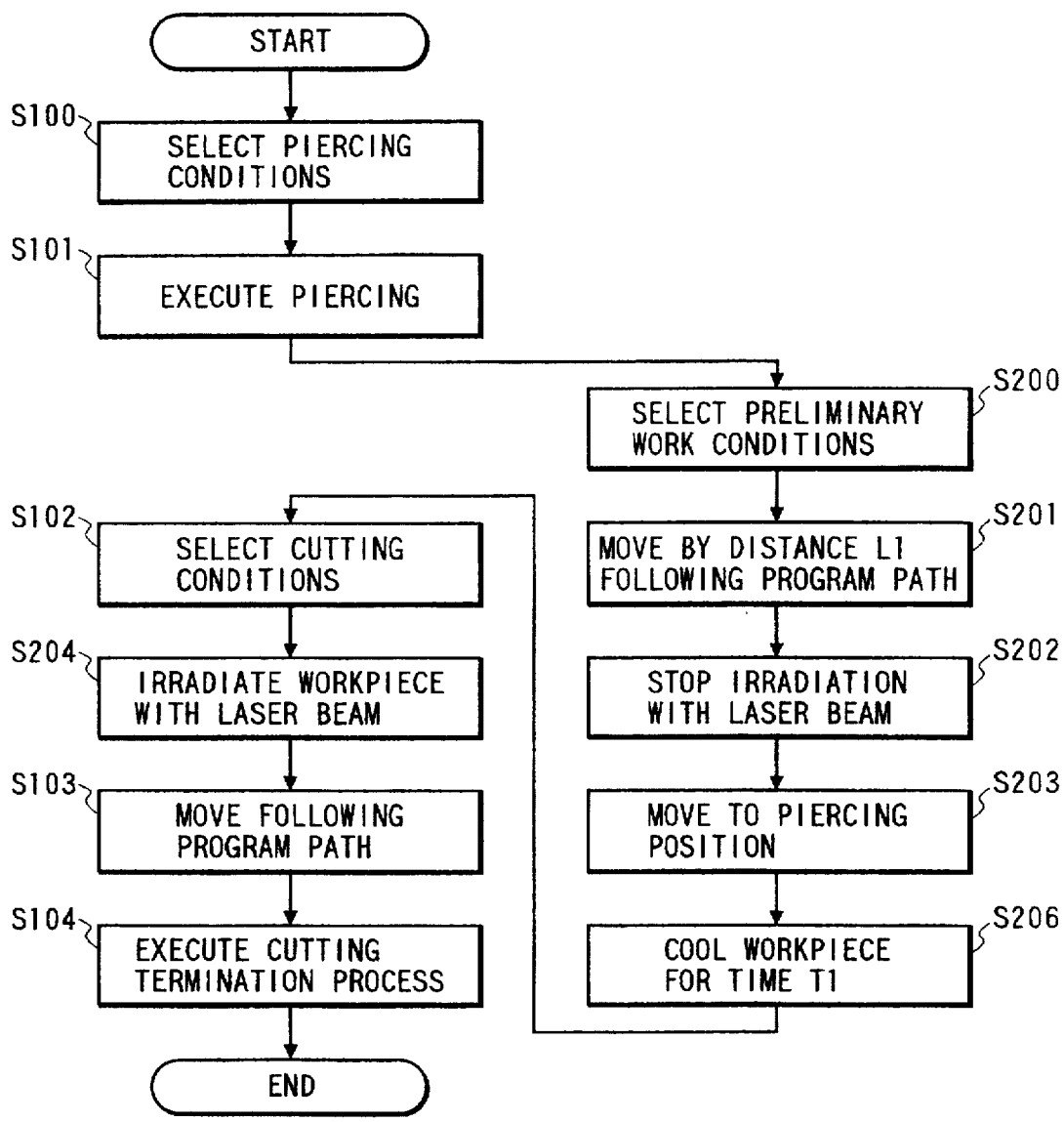
FIG. 7 is a work process flowchart according to the second embodiment of the invention.

FIG. 7 is a process flowchart in the second embodiment. Steps S100 to S104 and S200 to S204 in FIG. 7 are the same as those in FIG. 2 and will not be discussed again.

At step S206, a workpiece 10 is cooled until a lapse of the time T1 set from the beam irradiation stop time setting section 28 is determined and a stop time match signal is output. To do this, a cooling material spray dedicated to cooling may be attached or simply a work gas may be sprayed (it has the effect of cooling because irradiation with a laser beam stops). Cooling at step S206 may be executed before a return to the piercing position at step S203 if laser beam irradiation stops. Addition of a similar function to the process in FIG. 4 would also be able to produce an equivalent cooling effect.

Figure 8:
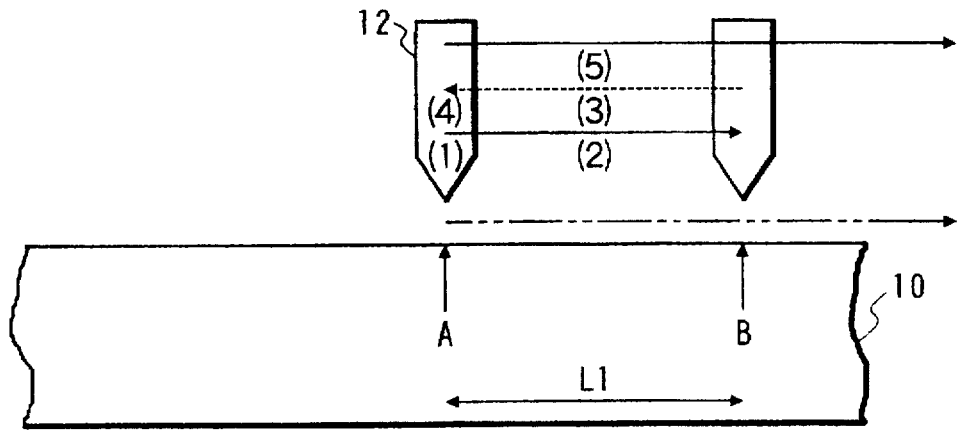
FIG. 8 is a drawing showing how to work on a workpiece according to the second embodiment of the invention.

FIG. 8 shows the working method in the embodiment.
(1) First, execute piercing at position A of workpiece 10;
(2) cut the workpiece 10 by distance L1 following the program path under start portion conditions;
(3) stop laser beam irradiation and return to the piercing position A;
(4) cool the workpiece 10 for the time T1; and
(5) irradiate the workpiece 10 with a laser beam for cutting under the original cutting conditions.

According to the embodiment, a groove where molten metal flows can be formed by the preliminary work for smoothing the molten metal flow, and the transition form piercing to cutting can be made in a state in which excessively accumulated heat does not exist. Thus, work failure at the transition time is prevented. Preliminary work and the cooling time need not be described in each work program and if the material, plate thickness, and cooling method are specified, the optimum preliminary work conditions and cooling time can also be selected, improving the precision and productivity of work program preparation.

Embodiment 3

Figure 9:
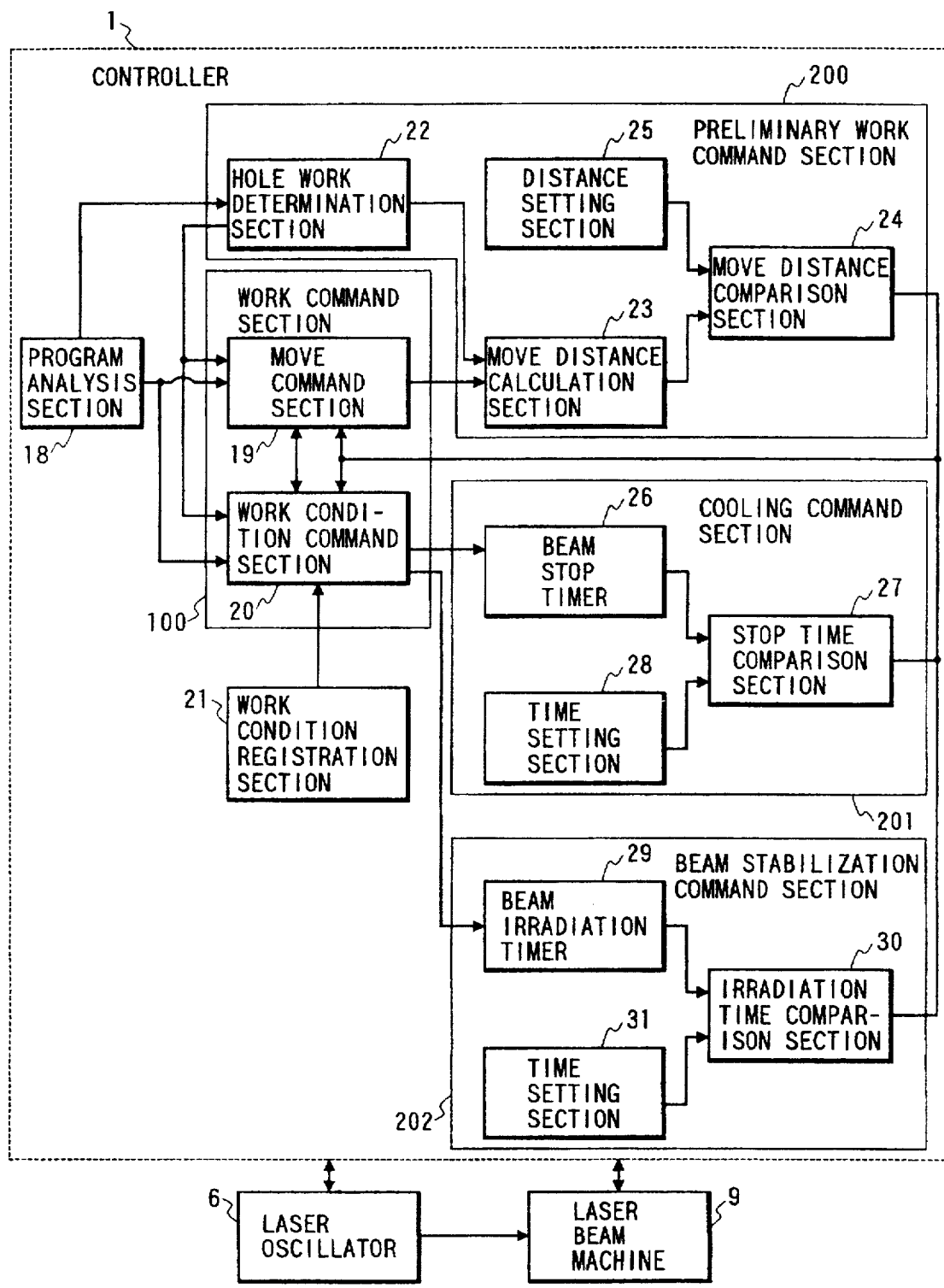
FIG. 9 is a functional block diagram showing a third embodiment of the invention.

FIG. 9 is a functional block diagram of a laser beam machining system according to a third embodiment of the invention. The configuration of the embodiment will be discussed with reference to FIG. 9. Functional blocks identical with or similar to those previously described with reference to FIG. 6 are denoted by the same reference numerals in FIG. 9 and will not be discussed again.

A beam stabilization time command section 202 uses a beam irradiation timer 29 for receiving a laser beam reirradiation command given by a work command section 100 to a laser oscillator 6 and counting the time from laser beam reirradiation, and outputs the count value as the irradiation time to a beam irradiation time comparison section 30, which then compares the irradiation time with time T2 set in a beam irradiation time setting section 31. If they match, the beam irradiation time comparison section 30 outputs a beam stabilization time match signal to the work command section 100. Meanwhile, the work command section 100 temporarily stops laser beam machining command output for operating a laser beam machine 9 until reception of the beam stabilization time match signal after receiving a stop time match signal from a stop command section 201 and outputting a laser oscillation command as a laser output reirradiation command to the laser oscillator 6. Upon reception of the beam stabilization time match signal, the work command section 100 releases the temporary stop.

Figure 10:
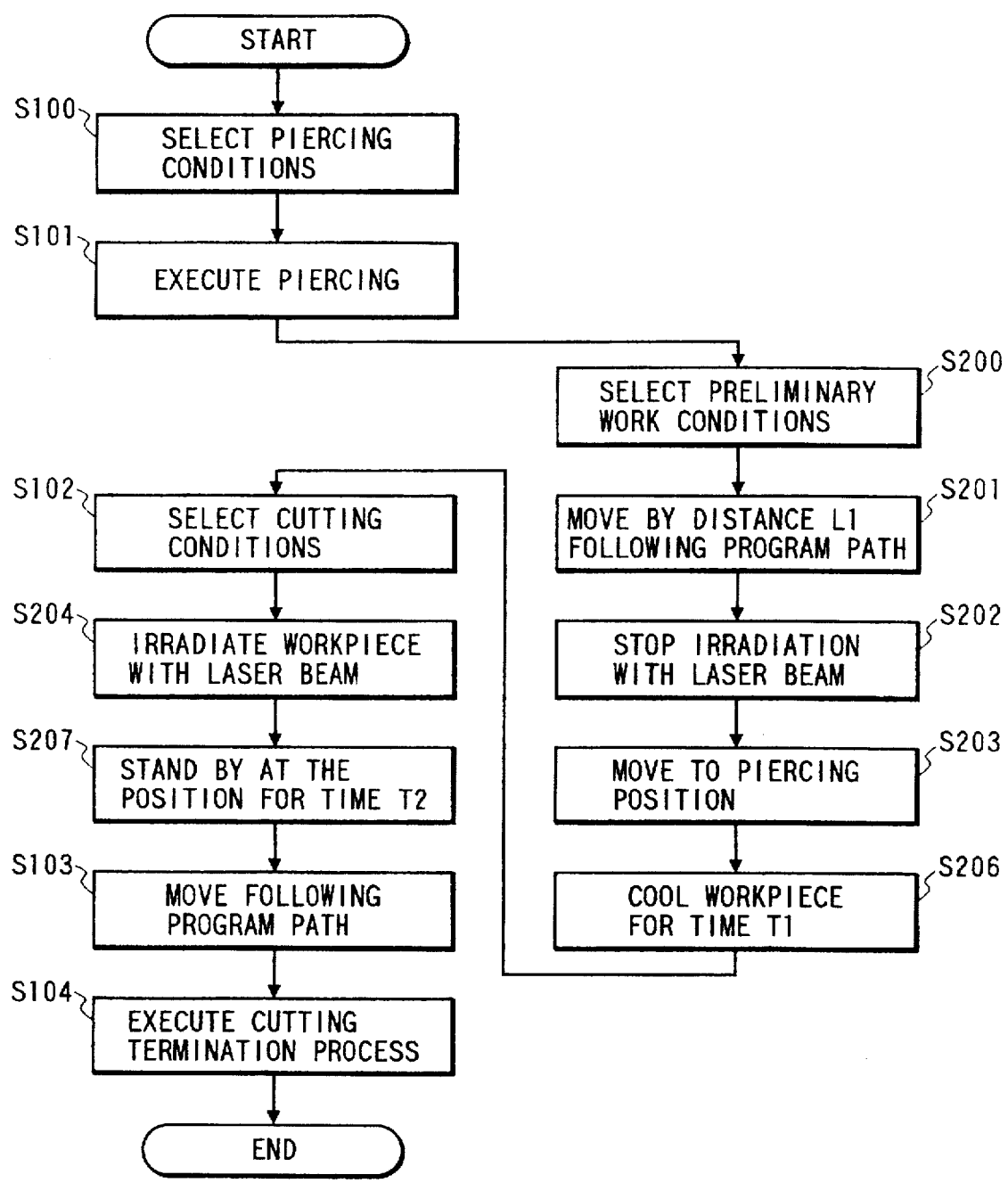
FIG. 10 is a work process flowchart according to the third embodiment of the invention.

FIG. 10 is a process flowchart in the third embodiment. Steps S100 to S104 and S200 to S206 in FIG. 10 are the same as those in FIG. 7 and will not be discussed again.

At step 207, the work command section 100 stops laser beam machining command output for cutting at step S103 and waits until input of the beam stabilization time match signal from the beam irradiation time comparison section 30. Meanwhile, output of the laser oscillator 6 and the heat lens state become stable. Addition of a similar function to the process in FIG. 4 would also be able to produce an equivalent effect.

Figure 11:
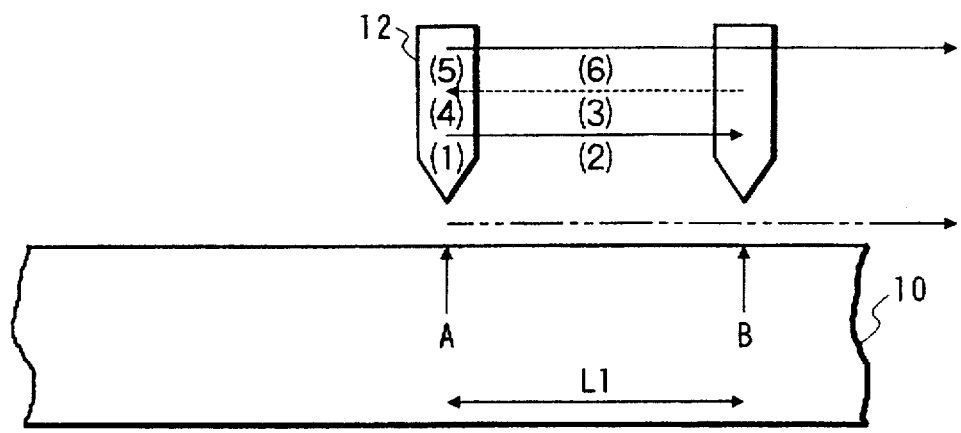
FIG. 11 is a drawing showing how to work on a workpiece according to the third embodiment of the invention.

FIG. 11 shows the working method in the embodiment.

(1) First, execute piercing at position A of workpiece 10;
(2) cut the workpiece 10 by distance L1 following the program path under start portion conditions;
(3) stop laser beam irradiation and return to the piercing position A;
(4) cool the workpiece 10 for the time T1;
(5) irradiate the workpiece 10 with a laser beam under the original cutting conditions and stand by for the time T2; and
(6) cut the workpiece 10 following the work path.

According to the embodiment, a groove where molten metal flows can be formed by the preliminary work for smoothing the molten metal flow, and the transition form piercing to cutting can be made in a state in which excessively accumulated heat does not exist and laser beam output is stable. Thus, work failure at the transition time is prevented. Preliminary work, the cooling time, and a laser beam stabilizing procedure need not be described in each work program and if the material, plate thickness, and cooling method are specified, the optimum preliminary work conditions, cooling time, laser beam stabilizing time, etc., can also be selected, improving the precision and productivity of work program preparation.

Embodiment 4

The optimum numeric values of the distance L1 and the times T1 and T2 in the first to third embodiments vary depending on the workpiece 10. Therefore, fixed values cannot cover different workpieces 10 and it is inconvenient to set the values in parameters each time.

To take countermeasures against it, FIG. 12 shows an embodiment wherein the parameters such as L1 are added to the work condition data corresponding to workpieces 10.

The work condition data as shown in FIG. 12 is registered for each workpiece 10. The distance L1 and the times T1 and T2 are set in data 33 to 35. Whether or not the process shown in the embodiments is to be executed is set in data 32. Since workpieces 10 like thin plates do not require the process shown in the embodiments and if the process is executed, the work time is prolonged; the process should not be used.

Working on even thick plates does not require the process shown in the embodiments if the cutting speed is low. If the capacity of the work condition registration section 21 (RAM 4) has a margin, the data pieces 32 to 35 may be able to be set in the conditions of the first condition group and later.

Embodiment 5

Figure 13:
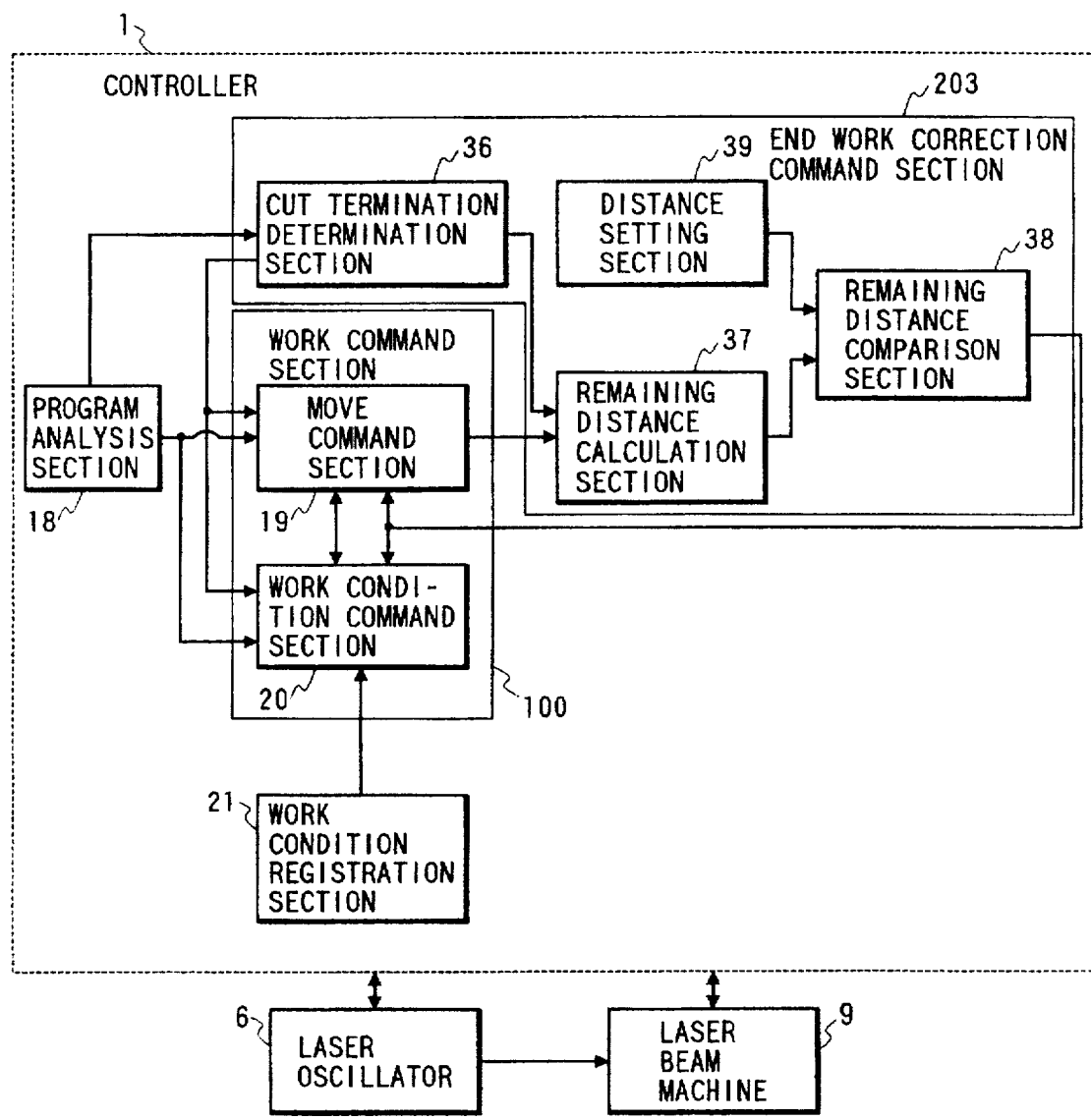
FIG. 13 is a functional block diagram showing a fifth embodiment of the invention.

FIG. 13 is a functional block diagram of a laser beam machining system according to a fifth embodiment of the invention. The configuration of the embodiment will be discussed with reference to FIG. 13. Functional blocks identical with or similar to those previously described with reference to FIG. 1 are denoted by the same reference numerals in FIG. 13 and will not be discussed again.

A cut end command section 203 consists of a cut termination determination section 36, a remaining distance calculation section 37, a remaining distance comparison section 38, and a distance setting section 39. The cut termination determination section 36 detects a cut termination instruction in work program instructions analyzed by a program analysis section 18, determines that the move path command processed and given by the program analysis section 18 before the cut termination instruction is a move to the cut termination point, and sends an end work command signal to a work command section 100 and the remaining move distance calculation section 37. For example, in the work program example in FIG. 21A, if the cut termination command code M121 is detected, the move preceding the code is a move to the cut termination point. Receiving the end work command signal output from the cut termination determination section 36, the remaining move distance calculation section 37 calculates the remaining move distance from the move path command determined to be a move to the cut termination point and outputs the calculation value to the remaining move distance comparison section 38, which then compares the remaining move distance calculated by the remaining move distance calculation section 37 with distance L2 set in the distance setting section 39. If they match, the remaining move distance comparison section 38 outputs a remaining distance match command signal to the work command section 100. Meanwhile, receiving the end work command signal, the work command section 100 calls end work condition data from a work condition registration section 21, and receiving the remaining distance match command signal, it replaces the subsequent work condition data with the end work condition data.

Figure 14:
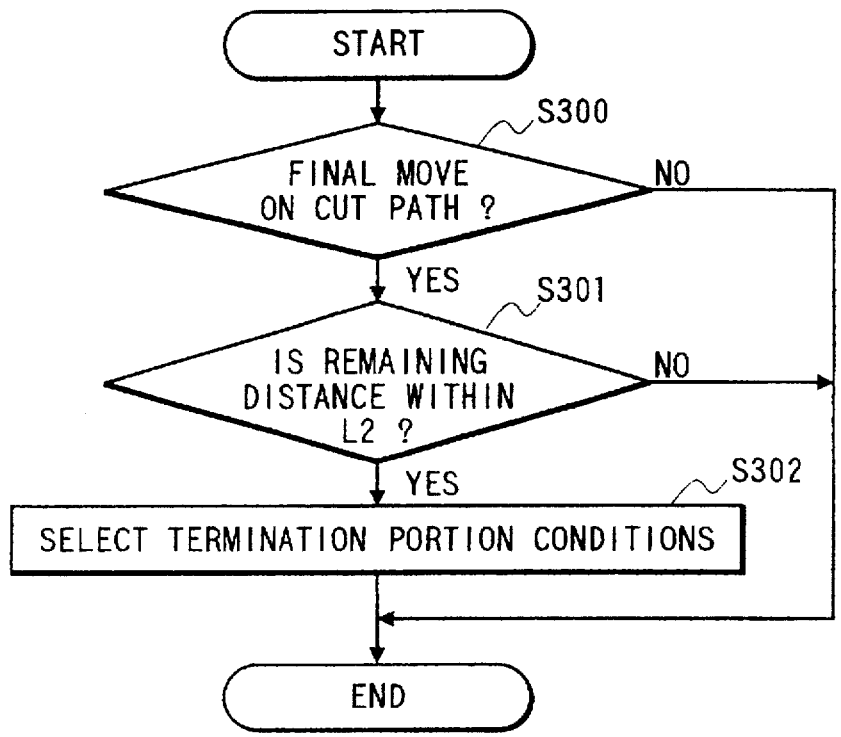
FIG. 14 is a work process flowchart according to the fifth embodiment of the invention.

FIG. 14 is a process flowchart in the fifth embodiment. This process is a work condition change process executed at the same time as the move process following the program path in step S103 in FIGS. 2, 4, etc.

At step S300, the cut termination determination section 36 determines whether or not the current command being executed is the final move for cutting. If the command is the final move for cutting, at step S301 the remaining move distance comparison section 38 determines whether or not the remaining move distance is within a predetermined distance L2.

If the remaining distance to cutting out products is within L2, at step S302 the work condition command section 20 calls and sets the end work condition data for the termination portion. For the termination portion conditions, low-speed, low-output, low-frequency pulse cut conditions are previously registered in the work condition registration section 21 (RAM 4) as work condition data like the cutting conditions. If the current move being made is not the final move for cutting or the remaining move distance is more than L2, the work conditions are not changed and the process is terminated.

Figure 15:
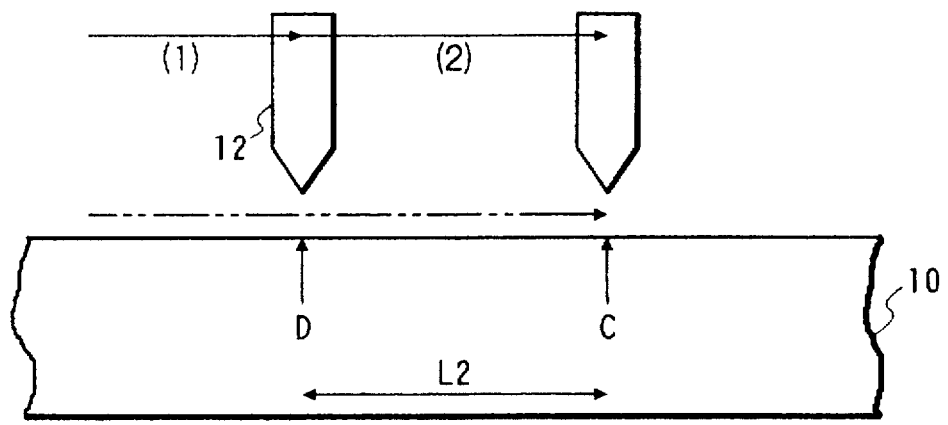
FIG. 15 is a drawing showing how to work on a workpiece according to the fifth embodiment of the invention.

FIG. 15 shows the working method in the embodiment.
(1) Cut workpiece 10 toward cut termination point C; and
(2) change work conditions to termination portion conditions at position D at distance L2 before the cut termination point C, and cut the workpiece 10.

Although work failure in the cut start portion can be prevented according to the first to fourth embodiments, the cut termination part is molten. That is, if the cut termination point is reached in a state in which the bottom face cutting lags behind the top face cutting of the workpiece 10, a slight uncut portion remains in the bottom face although the top face is completely cut. If a laser beam is furthermore applied in the state, the slight uncut portion is molten at a time, a trace of which remains on the cut surface, degrading the quality. The embodiment is intended to solve the problem. According to the embodiment, work failure just before cutting can be prevented. Detailed work information on the cut termination portion need not be described in each work program, improving the productivity and precision of the work programs.

Figure 16:
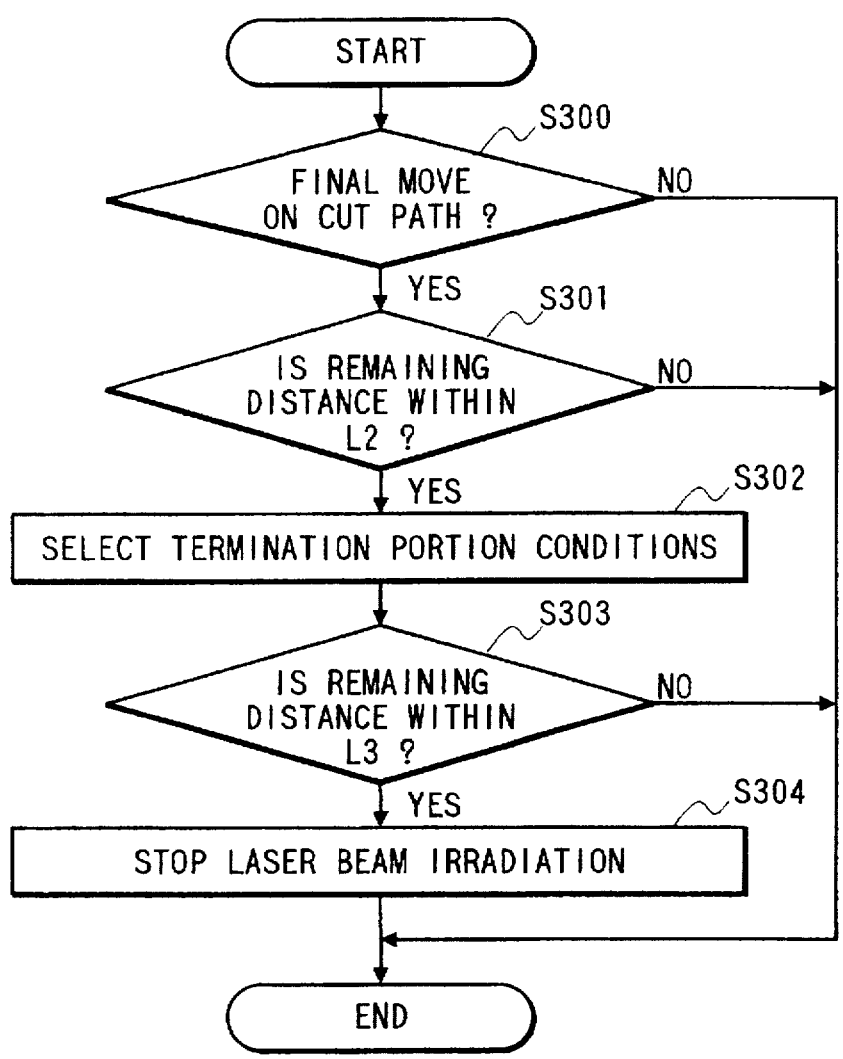
FIG. 16 is a work process flowchart according to another form of the fifth embodiment of the invention.

FIG. 16 is a process flowchart in another form of the embodiment applied for easily and reliably making a microjoint in the cut termination portion. The process procedure will be discussed with reference to the figure.

Steps S300 to S302 in FIG. 16 are the same as those in FIG. 14. Two different remaining distances L2 and L3 are set in the distance setting section 39. The remaining move distance comparison section 38 compares each of the setup remaining distances with the calculated remaining distance. At step S303, it determines whether or not the remaining move distance is within the predetermined distance L3. If the remaining distance to cutting out products is within L3, at step S304 the laser beam irradiation is stopped. To do this, a laser beam irradiation stop signal may be output to the laser oscillator or an output command may be set to 0. An uncut part at the distance L3 is made by stopping the laser beam irradiation. Since the work conditions are changed to low-speed and low-output conditions dedicated to the termination portion at step S302, a proper microjoint of a given microjoint width can be made independently of the cut conditions applied so far; program edit is not required.

Figure 17:
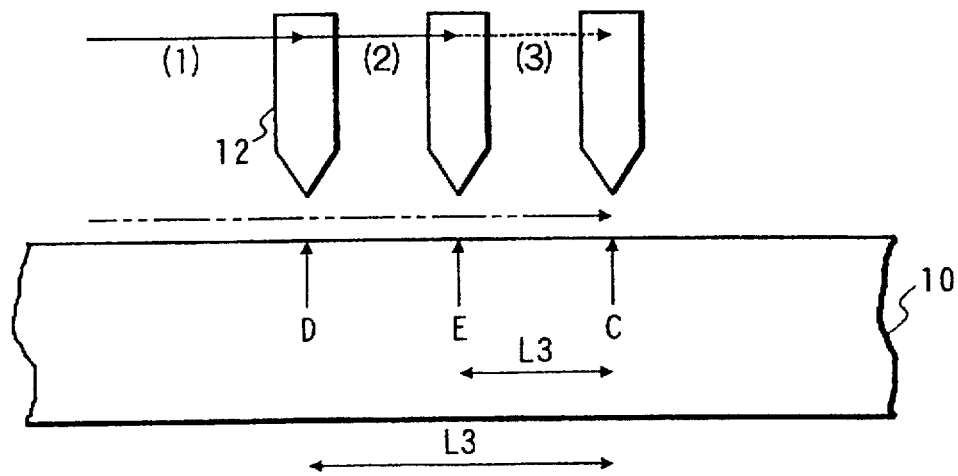
FIG. 17 is a drawing showing how to work on a workpiece according to the form of the fifth embodiment of the invention in FIG. 16.
Figure 20:
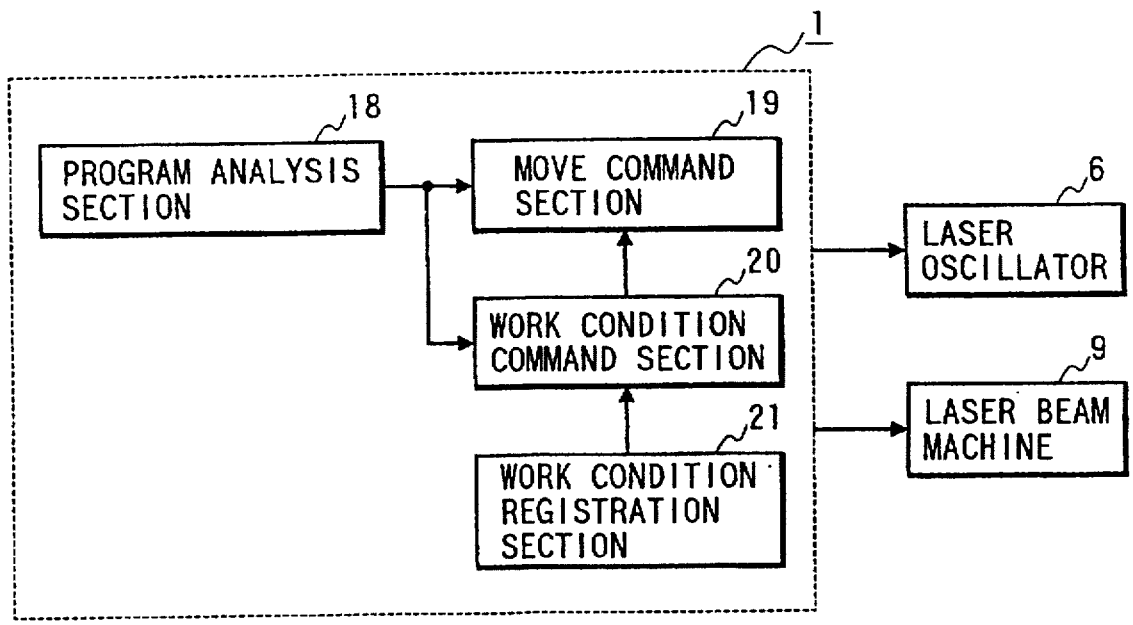
FIG. 20 is a functional block diagram of the conventional laser beam machining system.

FIG. 17 shows the working method in the modified form of the embodiment.
(1) Cut workpiece 10 toward cut termination point C;
(2) change work conditions to termination portion conditions at position D at distance L2 before the cut termination point C, and cut the workpiece 10; and
(3) stop laser beam irradiation at position E at distance L3 before the cut termination point C.

In conventional systems, the cut termination point is set to a position where an uncut portion is produced in a work program. Since the proper microjoint width varies depending on the cutting speed and laser output, program preparation is a demanding task. To change the microjoint width after actual working, program edit is also a demanding task. According to the modified form of the embodiment, the problems are solved and stable microjoint production is enabled, improving the productivity and precision of the work programs.

Embodiment 6

The optimum numeric values of the distances L2 and L3 in the fifth embodiment vary depending on the workpiece 10. Therefore, fixed values cannot cover different workpieces 10 and it is inconvenient to set the values in parameters each time. To take countermeasures against it, FIG. 18 shows an embodiment wherein the parameters such as L2 are added to the work condition data corresponding to workpieces 10.

The work condition data as shown in FIG. 18 is registered for each workpiece 10. The distances L2 and L3 are set in data 41 and 43. Whether or not the processes shown in the embodiments are to be executed is set in data 40 and 42. The processes shown in the embodiments may be unnecessary depending on the working conditions. If the RAM capacity has a margin, the data pieces 40 to 43 may be able to be set in the conditions of the first condition group and later.

According to the invention (aspects 1-3), preliminary work not specified in a work program is executed for forming a groove prior to cutting after piercing. Thus, at the cutting, a poor flow of molten metal can be prevented from causing work failure to occur and the accuracy and productivity of work program preparation are improved.

According to the invention (aspects 4-6), preliminary work not specified in a work program is executed for forming a groove and further the workpiece is cooled for the predetermined time prior to cutting after piercing. Thus, at the cutting, a poor flow of molten metal or excessive heating can be prevented from causing work failure to occur and the accuracy and productivity of work program preparation are improved.

According to the invention (aspects 7-9), after piercing, preliminary work not specified in a work program is executed for forming a groove and further the workpiece is cooled for the predetermined time, then is irradiated for the predetermined time to stabilize laser beam output before the workpiece is cut in accordance with work program commands. Thus, at the beginning of the cutting, a poor flow of molten metal, excessive heating, or an unstable laser beam can be prevented from causing work failure to occur and comparatively simple work programs are only needed, thus improving the accuracy and productivity of work program preparation.

According to the invention (aspects 10-12), the work conditions can be changed to end work conditions not specified in a work program at a position a predetermined distance before the cut termination point for cutting the workpiece to the cut termination point. Thus, melting the cut lag portion in the workpiece bottom face just before the cutting is complete can be prevented from causing work failure to occur and comparatively simple work programs are only needed, thus improving the accuracy and productivity of work program preparation.

What is claimed is:
1. A laser beam machining system, comprising:
   a controller;
   a laser oscillator for generating and outputting a laser beam upon reception of a work command for laser oscillation from said controller; and a laser beam machine for receiving and gathering the laser beam, irradiating a workpiece with the gathered laser beam, and moving the workpiece relative to a work head upon reception of a work command for a work path movement from said controller;

said controller, comprising:

a program analysis section for analyzing a work program in accordance with a control program procedure and generating and outputting work program commands;

a work condition registration section for storing work condition data selected from a group of piercing, preliminary work, and cutting, and selectively outputting the work condition data in response to a request;

a work command section for, upon reception of a work program command from said program analysis section, calling corresponding work condition data from said work condition registration section, and generating and outputting the work command for laser oscillation and the work command for a work path movement; and a preliminary work command section for detecting a piercing instruction of the work program analyzed by said program analysis section, and generating and outputting a preliminary work command signal to said work command section;

said work command section, in conjunction with said preliminary work command section, for processing a predetermined amount of work program commands after receiving a work program command based on the piercing instruction and generating a work command;

said work command section for replacing specified work condition data with preliminary work condition data and generating a preliminary work command for forming a groove in the workpiece, then generating a work command for returning said laser beam machine to a piercing position during zero laser oscillator output and causing said work command section to output the work command for laser oscillation and the work command for a work path movement;

wherein said groove permits flow of molten metal during a transition from piercing to cutting the workpiece.

2. The laser beam machining system of claim 1, said controller further comprising a cooling command section for inputting the work command generated and output by said work command section during zero laser output and after a lapse of a predetermined time, outputting a cooling end signal to said work command section for causing said work command section to return to an operation in accordance with work program commands following the work program command based on the piercing instruction.

3. The laser beam machining system of claim 4, wherein said cooling command section comprises:

a beam stop timer, for starting, upon reception of the work command generated by said work command section during zero laser oscillator output, counting a cooling time and outputting a final count time;

a time setter for storing a time T1 for stopping oscillation of said laser oscillator; and a stop time comparator for comparing, upon reception of the final count time output from said beam stop timer, the time T1 with the final count time, and if the final count time and time T1 are equal, outputting a cooling end signal to said work command section for causing said work command section to return to the operation in accordance with the work program commands following the work program command based on the piercing instruction.

4. The laser beam machining system of claim 1, said controller further comprising a cooling command section for inputting the work command during zero laser oscillator output generated and output by said work command section and said preliminary work command section and after a lapse of a predetermined time, outputting a cooling end signal to said work command section for causing said work command section to generate and output a work command for laser beam irradiation; and a beam stabilization command section for, after a lapse of a predetermined time since reception of a cooling preliminary work end signal output when said work command section receives the cooling end signal and generates the work command for laser beam irradiation, outputting a beam stabilization signal to said work command section for causing said work command section to return to an operation in accordance with the work program commands following the work program command based on the piercing instruction.

5. The laser beam machining system of claim 4, wherein said beam stabilization command section comprises:

a beam irradiation timer, for counting up, upon reception of the cooling preliminary work end signal output by said work command section the elapsed time and outputting the count;

a time setter for storing a time T2 for continuing laser output; and an irradiation time comparator for, upon reception of the count from said beam irradiation timer, calling the time T2 from said time setter and comparing the count with the time T2, and if the time T2 and count are equal, outputting a beam stabilization signal.

6. The laser beam machining system of claim 1, said controller further comprising an end work correction command section for detecting a cut termination instruction of the work program analyzed by said program analysis section, generating and outputting an end work correction command signal to said work command section, said end work correction command section generating a work command for end work correction and causing said work command section to output the work command for end work correction and return to an operation based on work program commands for the cut termination instruction output from said program analysis section.

7. The laser beam machining system of claim 6, wherein said end work correction command section, comprises:

a cut termination determination section for detecting the cut termination instruction analyzed by said program analysis section, generating and outputting an end work correction command signal to said work command section for causing said work command section to call and set end work condition data from said work condition registration section and correct a specified portion of an end work command with the end work condition data;

a remaining distance calculation section for receiving the end work correction command signal and a work command specifying a work path move preceding the cut termination instruction output from said work command section and calculating and outputting a remaining distance until the cutting is complete;

a distance setting section in which end work correction distance L2 is set; and a remaining distance comparison section for, upon reception of the remaining distance until the cutting is complete output from said remaining distance calculation section, calling the distance L2 from said distance setting section and comparing the remaining distance with the distance L2, if the remaining distance and the distance L2 match, said remaining distance comparison section generating an end correction start signal and outputting the end correction start signal to said work command section for causing said work command section to correct the end work command.

8. A laser beam machining system, comprising:

a controller;

a laser oscillator for generating and outputting a laser beam upon reception of a work command for laser oscillation from said controller; and a laser beam machine for receiving and gathering the laser beam, irradiating a workpiece with the gathered laser beam, and moving the workpiece relative to a work head upon reception of a work command for a work path movement from said controller;

said controller, comprising:

a program analysis section for analyzing a work program in accordance with a control program procedure and generating and outputting work program commands;

a work condition registration section for storing work condition data selected from a group of piercing, preliminary work, and cutting, and selectively outputting the work condition data in response to a request;

a work command section for, upon reception of a work program command from said Program analysis section, calling corresponding work condition data from said work condition registration section, and generating and outputting the work command for laser oscillation and the work command for a work path movement; and a preliminary work command section for detecting a piercing instruction of the work program analyzed by said program analysis section, and generating and outputting a preliminary work command signal to said work command section;

said work command section, in conjunction with said preliminary work command section, for processing a predetermined amount of work program commands after receiving a work program command based on the piercing instruction and generating a work command;

said work command section for replacing specified work condition data with preliminary work condition data and generating a preliminary work command, then generating a work command for returning to a piercing position during zero laser oscillator output and causing said work command section to output the work command for laser oscillation and the work command for a work path movement;

wherein said preliminary work command section, comprises:

a work hole determination section for detecting the piercing instruction of the work program analyzed by said program analysis section, generating and outputting a preliminary work command signal to said work command section for causing said work command section to call preliminary work condition data from said work condition registration section and generate and output a preliminary work command with the preliminary work condition data from a cutting program command output from said program analysis section;

a move distance calculation section for, upon reception of the preliminary work command signal, adding work path movement distances for cutting from the preliminary work command generated by said work command section and outputting the resultant value;

a distance setting section for outputting a predetermined distance L1 for preliminary work in response to a request; and a move distance comparison section for, upon reception of the resultant value, calling the distance L1 and comparing the distance L1 with the resultant value, if the distance L1 and the resultant value match, said move distance comparison section for outputting a preliminary work distance match signal to said work command section for causing said work command section to terminate generation of the preliminary work command, to generate and output a work command to said laser oscillator during zero laser output, and to generate and output a work command to said laser beam machine to return to the piercing position and then return to motion in accordance with the cutting work program commands.

9. A laser beam machining method for irradiating a workpiece which moves relatively to the laser beam in accordance with a work program for cutting the workpiece at a work position, said method comprising the steps of:

piercing the workpiece at a piercing position in accordance with contents specified in the work program;

executing, after the piercing, preliminary work on the workpiece along a work path specified in work program steps or in a direction reverse to the specified work path for a predetermined distance L1 under preliminary work conditions which are not specified in the work program to thereby form a groove in the workpiece;

performing an operation, not specified in the work program, for stopping the laser beam irradiation and returning the work position to the piercing position; and cutting the workpiece in accordance with the contents specified in the work program steps following the piercing specification while permitting any molten metal to flow through said groove during a transition from piercing to cutting the workpiece.

10. The laser beam machining method of claim 9, further comprising the step of performing an operation, not specified in the work program, for cooling the workpiece for a predetermined time T1 after the laser beam irradiation is stopped.

11. The laser beam machining method of claim 9, further comprising the steps of performing an operation, not specified in the work program, for cooling the workpiece for a predetermined time T1 after the laser beam irradiation is stopped; and performing an operation, not specified in the work program, at a position after the cooling, for executing laser beam oscillation for a predetermined time T2 to stabilize laser output.

* * * * *